(12) United States Patent
Lin et al.

(10) Patent No.: US 11,057,295 B1
(45) Date of Patent: Jul. 6, 2021

(54) LOOP AVOIDANCE AND EGRESS LINK PROTECTION WITH ETHERNET VIRTUAL PRIVATE NETWORK (EVPN) FAST REROUTE (FRR)

(71) Applicant: Juniper Networks, Inc., Sunnyvale, CA (US)

(72) Inventors: Wen Lin, Andover, MA (US); Yi Zheng, Concord, MA (US); SelvaKumar Sivaraj, Sunnyvale, CA (US); Vasudevan Venkatraman, Bangalore (IN); Prabhu Raj V. K., Bangalore (IN); Channasangamesh S. Hugar, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 16/777,526

(22) Filed: Jan. 30, 2020

Related U.S. Application Data

(60) Provisional application No. 62/958,290, filed on Jan. 7, 2020.

(51) Int. Cl.
  *H04L 12/729* (2013.01)
  *H04L 12/707* (2013.01)
  (Continued)

(52) U.S. Cl.
  CPC ........ *H04L 45/125* (2013.01); *H04L 12/4633* (2013.01); *H04L 45/22* (2013.01);
  (Continued)

(58) Field of Classification Search
  None
  See application file for complete search history.

(56) References Cited

U.S. PATENT DOCUMENTS

| 10,666,459 | B1 * | 5/2020 | Sajassi | .................... H04L 45/50 |
| 2017/0195135 | A1 * | 7/2017 | Singh | ....................... H04L 45/16 |

(Continued)

*Primary Examiner* — Edan Orgad
*Assistant Examiner* — Emmanuel K Maglo
(74) *Attorney, Agent, or Firm* — John C. Pokotylo; Pokotylo Patent Services

(57) ABSTRACT

The problem of looping at the egress of a transport network with a CE multihomed to a protected egress PE and a backup/protector egress PE can be avoided by (a) enabling the protector egress PE to distinguish between fast reroute (FRR) traffic coming from the protected egress PE and normal known unicast (KU) traffic coming from a PE of the transport network that is not attached to the same multihomed segment; (b) receiving, by the protector egress PE, known unicast data, to be forwarded to the CE; (c) determining, by the protector egress PE, that a link between it and the CE is unavailable; and (d) responsive to determining that the link between the protector egress PE and the CE is unavailable, (1) determining whether the known unicast traffic received was sent from the protected egress PE or from another PE of the transport network that is not attached to the same multihomed segment, and (2) responsive to a determination that the known unicast traffic received was sent from the protected egress PE, discarding the known unicast traffic received, and otherwise, responsive to a determination that the known unicast (KU) traffic received was sent from another PE of the transport network that is not attached to the same multihomed segment, sending the known unicast traffic, via a backup tunnel, to an egress PE which protects the protector egress PE.

20 Claims, 13 Drawing Sheets

(51) Int. Cl.
*H04L 12/723* (2013.01)
*H04L 12/717* (2013.01)
*H04L 12/46* (2006.01)
*H04L 29/06* (2006.01)

(52) U.S. Cl.
CPC .............. *H04L 45/42* (2013.01); *H04L 45/50* (2013.01); *H04L 63/0272* (2013.01)

(56) References Cited

U.S. PATENT DOCUMENTS

| | | | |
|---|---|---|---|
| 2018/0167315 A1* | 6/2018 | Kanjariya | H04L 45/02 |
| 2019/0245779 A1* | 8/2019 | Jonnalagadda | H04L 12/4641 |
| 2020/0014557 A1* | 1/2020 | Wang | H04L 45/22 |
| 2020/0014623 A1* | 1/2020 | Wang | H04L 12/46 |
| 2020/0099610 A1* | 3/2020 | Heron | H04L 45/28 |

\* cited by examiner

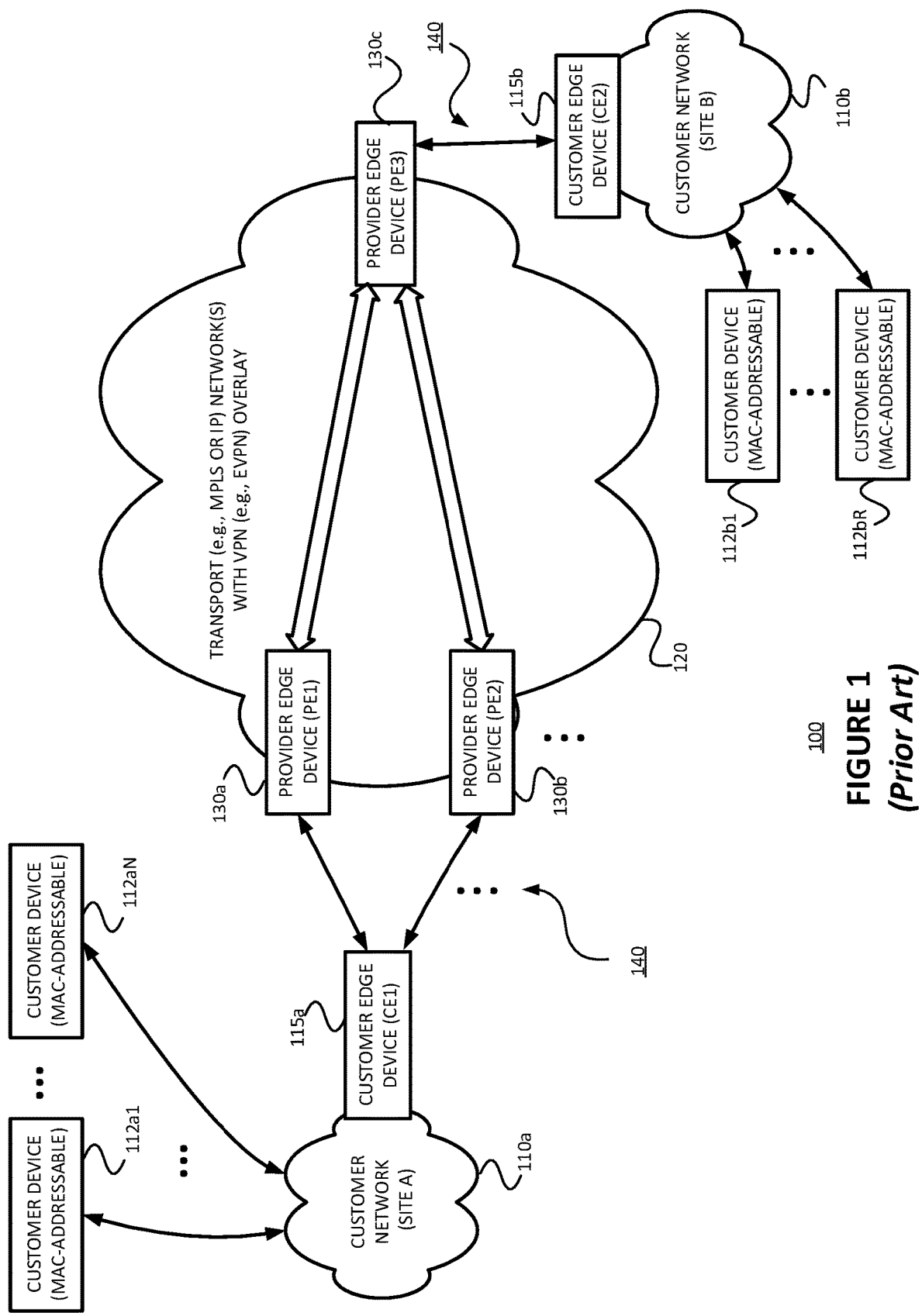
FIGURE 1 (*Prior Art*)

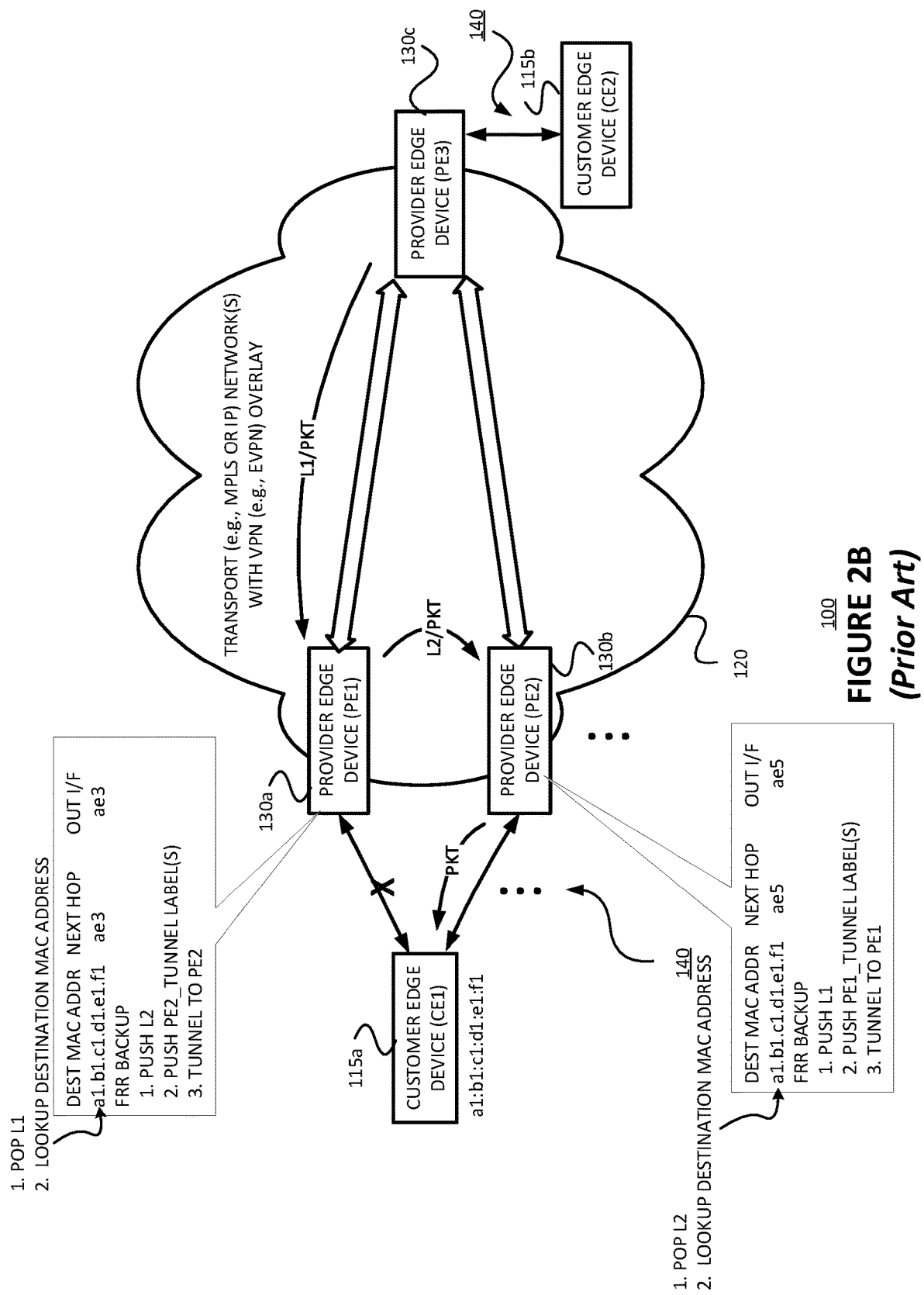
FIGURE 2B *(Prior Art)*

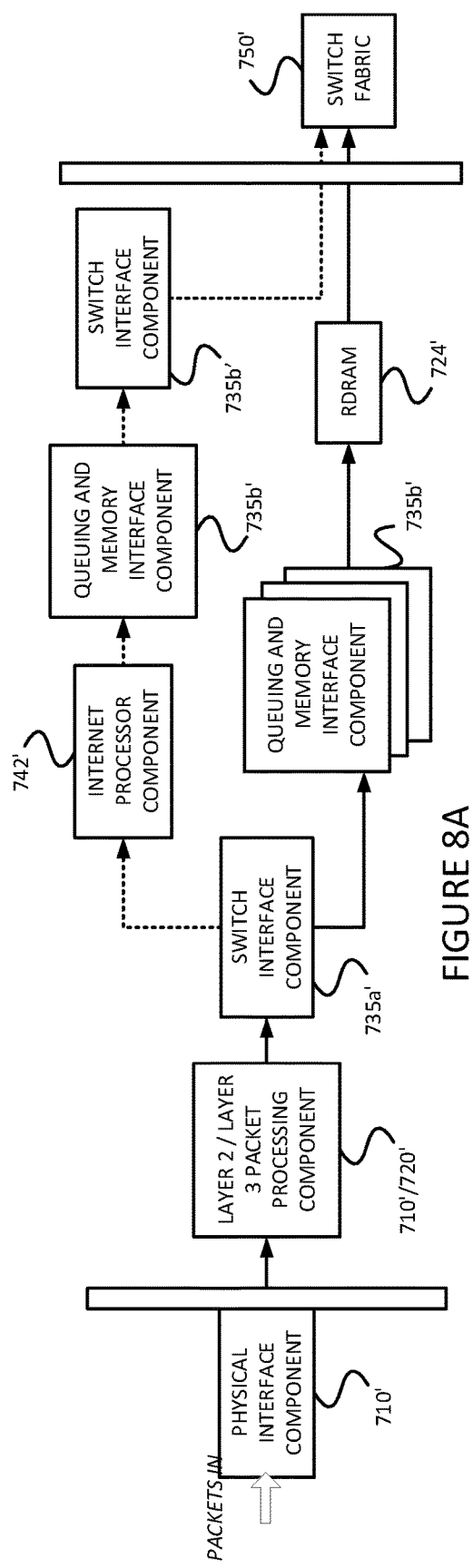
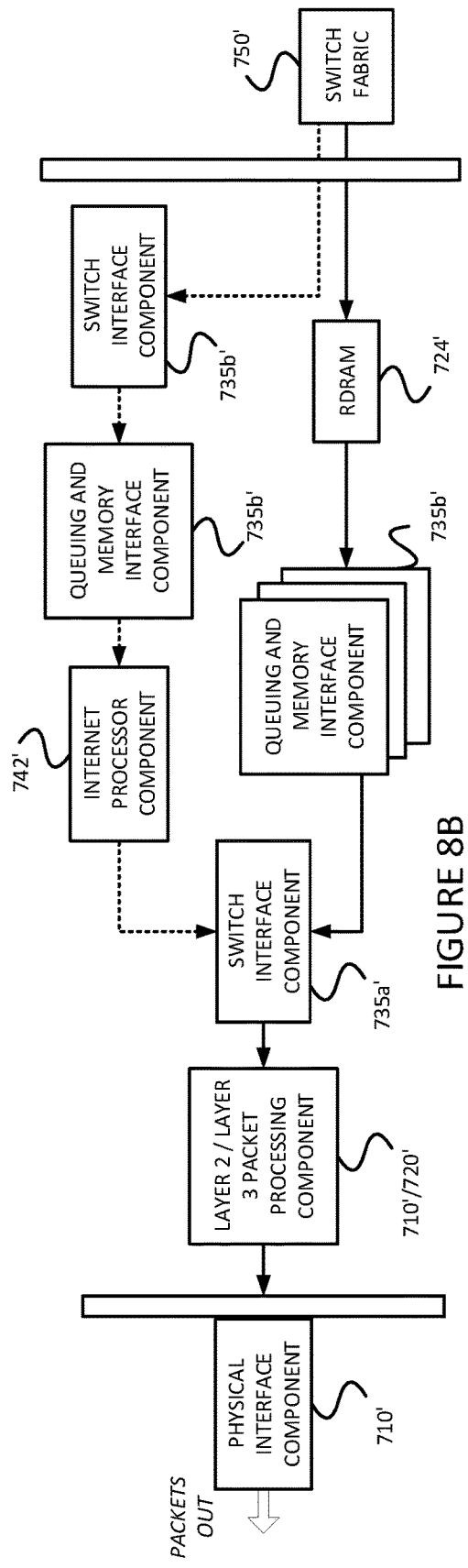
FIGURE 8A
FIGURE 8B

LOOP AVOIDANCE AND EGRESS LINK PROTECTION WITH ETHERNET VIRTUAL PRIVATE NETWORK (EVPN) FAST REROUTE (FRR)

§ 0. RELATED APPLICATION(S)

This application claims the benefit of provisional application Ser. No. 62/958,290 (referred to as "the '290 provisional" and incorporated herein by reference), filed on Jan. 7, 2020, titled "LOOP AVOIDANCE AND EGRESS LINK PROTECTION WITH ETHERNET VIRTUAL PRIVATE NETWORK (EVPN) FAST REROUTE (FRR)," and listing Wen LIN, Yi ZHENG, SelvaKumar SIVARAJ, Vasudevan VENKATRAMAN, Prabhu Raj V. K., and Channasangamesh S. HUGAR as the inventors. This application is not limited to any requirements in the '290 provisional.

§ 1. BACKGROUND

§ 1.1 Field of the Invention

The present disclosure concerns communications networks. More specifically, the present disclosure concerns multihomed access to a transport network in the context of a virtual private network (VPN), such as an Ethernet VPN (EVPN) for example.

§ 1.2 Background Information

The description of art in this section is not, and should not be interpreted to be, an admission that such art is prior art to the present invention.

A computer network is a collection of interconnected computing devices that can exchange data and share resources. Example network devices include layer two devices that operate within the second layer (i.e., L2, or the data link layer) of the Open Systems Interconnection (OSI) reference model, and layer three devices that operate within the third layer (i.e., L3, or the network layer) of the OSI reference model. Network devices (such as routers, switches, etc., generally referred to as "nodes") within computer networks are interconnected through one or more communications links, thereby defining a network topology. Such network nodes often include at least one control unit that provides so-called "control plane" functionality and at least one forwarding unit for routing and/or switching data units, such as packets for example.

§ 1.2.1 Known Private Networking Technologies

For many entities (such as small businesses, universities, etc.), local area networks (or "LANs") suffice for intra-entity communications. Indeed, LANs are quite popular since they are relatively inexpensive to deploy, operate, and manage, and are based on mature, well-developed technology (e.g., Ethernet). Unfortunately, however, most entities need to communicate (e.g., video, voice, and/or data) with their own facilities, or others, beyond their immediate location. Thus, wide area networks (or "WANs") are needed. Very often, entities want at least some privacy or security attached to their communications.

Presently, private long-haul communications can take place over networks that can be generally classified into two types—(1) dedicated WANs that facilitate communications among multiple sites, and (2) public transport networks that allow one or more sites of a private network to communicate. Both of these types of networks are introduced below.

§ 1.2.1.1 Dedicated Wans

Dedicated wide area networks ("WANs") are typically implemented using leased lines or dedicated circuits to connect multiple sites. Customer premise routers or switches at these sites connect these leased lines or dedicated circuits together to facilitate connectivity between each site of the network. Most private networks with a relatively large number of sites will not have "fully meshed" network topologies (i.e., direct connections between each of the sites) due to the cost of leased lines or dedicated circuits and due to the complexity of configuring and managing customer premises equipment. Rather, some form of hierarchical network topology is typically employed in such instances. Unfortunately, dedicated WANs are relatively expensive and typically require the customer to have some networking expertise.

§ 1.2.1.2 Virtual Private Networks (VPNS)

Public transport networks are often used to allow remote users to connect to an enterprise network using some type of transport network technology. (Note that the word "public" in the phrase "public transport network" relays the fact that more than one entity may use it, even though it may be privately owned and managed, and not available to the general public.) Given the expense of WANs, as well as the expertise needed to manage them, virtual private networks (VPNs) using public transport networks have become increasingly popular. Multi-Protocol Label Switching (MPLS) technology is often used in public transport networks.

Ethernet VPNs (EVPNs), such as Border Gateway Protocol (BGP) Multi-Protocol Label Switching (MPLS)-based EVPNs, are now introduced.

§ 1.2.1.2.1 EVPNS (RFC 7209)

Virtual Private LAN Service (VPLS) (e.g., as defined in Request for Comments (RFC) 4664, RFC 4761 and RFC 4762 from the Internet Engineering Task Force (IETF), each of which is incorporated herein by reference) is a proven and widely deployed technology. Unfortunately, VPLS has some limitations with respect to multihoming (i.e., where a customer premise edge device (CE) is connected with more than one service provider edge device (PE) of a transport network, so that a backup/standby link can be used if a primary link fails). The document, Sajassi, et al., "Requirements for Ethernet VPN (EVPN)," *Request for Comments* 7209 (Internet Engineering Task Force, May 2014) (referred to as "RFC 7209" and incorporated herein by reference) specifies requirements for an EVPN to address various issues considered by some to be inadequately addressed by VPLS.

An EVPN may be used to extend two or more remote layer two (L2) customer networks through an intermediate layer three (L3) network (usually referred to as a "service provider transport network," or simply a "transport network") as if the intermediate L3 network does not exist from the perspective of the customer(s) (i.e., in a "transparent" manner). In particular, the EVPN transports L2 communications, such as Ethernet packets or "frames," between customer networks via the transport network. For example, L2 communications may be transported over traffic engineered label switched paths (LSPs) through the transport network (e.g., in accordance with MPLS). In a typical configuration, service provider edge devices (PEs) coupled to the customer edge network devices (CEs) of the customer networks define LSPs within the transport network to carry encapsulated L2 communications as if these customer networks were directly attached to the same local area network (LAN). In some configurations, the PEs may also be connected by an Internet Protocol (IP) infrastructure in which case IP/Generic Routing Encapsulation (GRE) tunneling or other IP tunneling can be used between the network devices.

§ 1.2.1.2.2 Bgp Mpls-Based EVPNS (RFC 7432)

The document, A. Sajassi, Ed., "BGP MPLS-Based Ethernet VPN," *Request for Comments* 7432 (Internet Engineering Task Force, February 2015) (referred to as "RFC 7432" and incorporated herein by reference) describes BGP MPLS-based EVPNs. An EVPN "instance" comprises CEs that are connected to PEs that form the edge of the (e.g., MPLS) transport network. As noted above, a CE may be a host, a router, or a switch. As also noted above, the PEs provide virtual Layer 2 bridged connectivity between the CEs. There may be multiple EVPN instances in the service provider transport network.

As further noted above, the PEs may be connected by an MPLS LSP infrastructure, which provides the benefits of MPLS technology, such as fast reroute, resiliency, etc. The PEs may also be connected by an IP infrastructure, in which case IP/GRE (Generic Routing Encapsulation) tunneling or other IP tunneling can be used between the PEs. RFC 7432 concerns procedures only for MPLS LSPs as the tunneling technology. However, such procedures are designed to be extensible to IP tunneling as the Packet Switched Network (PSN) tunneling technology.

§ 1.2.1.2.3 Multihoming in an EVPN

EVPN supports multihoming with two or more EVPN PEs attached to the same Ethernet Segment (ES) connecting the same CE. FIG. 1 illustrates an example EVPN environment 100 in which embodiments consistent with the present description may operate. As shown in the example environment 100, two or more remote layer two (L2) customer networks (sites A and B) 110a and 110b can be "stitched" together or extended through an intermediate layer three (L3) network (usually referred to as a "service provider transport network," or simply a "transport network") 120. The transport network 120 may be an MPLS or IP. As already discussed earlier, the EVPN overlays the transport network 120 and connects the two remote customer networks 110a and 110b in a so-called "transparent" manner (that is, as if the intermediate L3 network 120 does not exist from the perspective of the two remote customer networks 110a and 110b).

As noted above, if the service provider transport network 120 employs MPLS forwarding, the EVPN transports L2 communications, such as Ethernet packets or "frames," between customer networks 110a and 110b via traffic engineered label switched paths (LSPs) through the transport network 120 in accordance with one or more MPLS protocols. In some configurations, the PEs 110a, 110b, 110c may also be connected by an IP infrastructure, in which case IP/GRE tunneling or other IP tunneling can be used between the PEs.

In the example environment 100, the customer network-site A 110a is "multihomed" to the transport network 120 via CE1 115a and PE1 130a and PE2 130b via links 140. Multihoming may be used to increase network reliability (e.g., by having multiple links between the customer network-site A 110a and the transport network 120), and/or for load balancing (e.g., by dividing packet flows such that they go over different links, thereby avoiding the concentration of too much network traffic on a single link).

In some multihomed implementations, only one of the local PEs (130a and 130b) is active, while the other(s) is in standby (also referred to as "single active" or "active-standby"). Such implementations are mainly used for network resiliency, but are not helpful for load balancing. For example, if customer device 112a1 (at customer network-site A 110a) is sending a flow of packets to customer device 112b1 (at customer network-site A 110b), and customer device 112aN is sending a flow of packets to customer device 112bR, both flows go through an active PE (e.g., PE1 130a). If the active PE fails (or if the link to (or an interface of the link to the active PE) fails), the standby PE (e.g., PE2 130b) becomes active.

In other multihomed implementations, all of the local PEs (130a and 130b) are active simultaneously (referred to as "all active," or "active-active"). Such implementations are useful for load balancing network traffic. For example, if customer device 112a1 (at customer network-site A 110a) is sending a flow of packets to customer device 112b1 (at customer network-site B 110b), and customer device 112aN is sending a flow of packets to customer device 112bR, one flows might go through active PE1 130a and the other flow might go through active PE2 130b. There are many known schemes for load balancing (e.g., hashing packet header data (for example, a source/destination address pair) to a particular path).

RFC 7432 describes the functions, procedures, and associated BGP routes used to support multihoming in EVPN, and covers both multihomed device (MHD) and multihomed network (MHN) scenarios.

An EVPN PE may support different label allocation schemes for its known unicast traffic, such as label per EVPN Instance (EVI), or label per bridge domain (BD) or label per (multihomed) Ethernet segment (ES). Depending on the label allocation scheme and the PE's capability, a PE may support MPLS label-based lookup (MPLS label-based disposition) or MPLS label plus MAC lookup (MAC-based disposition) to send a known traffic to its final destination.

§ 1.2.1.2.4 the Potential for Looping at the Egress of an EVPN Having a Multihomed Ce In an EVPN network, an "egress PE" is an EVPN PE that receives traffic from other EVPN PEs that participate in the same EVPN instance. An egress PE passes received traffic to its EVPN instance for further processing and forwarding. In the case of EVPN multihoming, when an egress PE suffers a link failure on its locally attached ES, any of its peer multihomed PEs attached to the same Ethernet segment can act as its backup egress PE (also referred to as a "protector" for the egress PE) and send the traffic to the multihomed CE. For example, referring to FIG. 1, PE2 130b can act as a backup/protector egress PE for PE1 130a, and PE1 130a can act as a backup/protector egress PE for PE2 130b.

When MPLS is used for transport in the EVPN, there are a couple of existing fast reroute (FRR) mechanisms to protect against link failure of an egress PE for "known unicast" traffic. The existing mechanisms rely on two main steps. First, the egress PE pre-establishes a backup path (also known as a "bypass protection tunnel") to its peer multihomed PE. Second, the forwarding state for local repair is set up by having a "service label" point to the backup path ("bypass protection tunnel").

Currently, there are two ways to set up forwarding state. The way used will depend on whether or not the egress PE has the knowledge of the service label used by its backup egress PE.

If, on the one hand, the service label used by its backup egress PE is not known, the forwarding state in the protected egress PE will be set up based on context label/context ID. This option requires that the EVPN multihomed PEs support a context label/context ID. When traffic arrives with a context label, the backup egress PE performs context label switching or a MAC look up. Unfortunately, this option incurs a lot of overhead for forwarding, especially for Ethernet-LAN (E-LAN) and Ethernet-Tree (E-Tree) services. Consequently, this option is not widely deployed today.

If, on the other hand, the service label used by its backup/protector egress PE is known, the forwarding state in the protected egress PE will be set up based on the known service label used by its egress backup PE. Under this approach, the protected egress PE learns the service label of its backup/protector egress PE, and sets up the forwarding state for its bypass protection tunnel such that the protected PE will (1) perform a label swap (that is, swap the incoming service label with the service label of its backup/protector egress PE), or in some implementations, perform a label pop, followed by destination MAC address lookup, before pushing the service label advertised by its protector/backup PE, and then (2) push the transport label or transport label stack used by the bypass protection tunnel. For traffic sent to the bypass protection tunnel, since the service label is owned and allocated by the backup/protector egress PE itself, when the traffic arrives at the backup/protector egress PE, the backup/protector egress PE forwards the traffic to the destination based on its normal forwarding procedure. (This mechanism is also mentioned in the EVPN VPWS (See the document, S. Boutros, et al., "Virtual Private Wire Service Support in Ethernet VPN," *Request for Comments* 8214 (Internet Engineering Task Force, August 2017)(referred to as "RFC 8214" and incorporated herein by reference).) Since this approach achieves fast reroute for egress link failure and it is relatively simple to execute, it is often recommended and used as an egress fast reroute (FRR) link protection scheme for EVPN.

Referring to FIGS. 1 and 2A, PE1 130*a*, PE2 130*b* and PE3 130*c* are EVPN PEs belong to the same EVPN instance overlaying the transport network 120. PE1 130*a* and PE2 130*b* are multihomed to CE1 115*a*. Assume that PE1 130*a* and PE2 130*b* are configured to protect each other in the event of an access link failure. As indicated by the dotted arcs in FIG. 2A, labels L1 and L2 are the service labels advertised by PE1 and PE2, respectively, for known unicast traffic. As shown, forwarding information stored on PE1 130*a* includes, for destination MAC address a1:b1:c1:d1:e1:f1, that the next hop is the outgoing interface (ae3) connecting PE1 130*a* with CE1 115*a*. Although not shown, forwarding information stored on PE1 130*a* may also, or alternatively, include for service label L1, a pop instruction and that the next hop is the outgoing interface ae3. That is, depending on the label allocation scheme and the PE's capability, a PE may support MPLS label-based lookup (MPLS-label-based disposition), or MPLS label plus MAC lookup (MAC-based-disposition) to send a known traffic to its final destination. Further, to protect against link failure, the next hop/outgoing interface ae3 may have a defined fast reroute (FRR) which (1) pushes label L2, (2) pushes one or more label(s) for a backup tunnel to PE2, and (3) tunnels the result to PE2. Similarly, as shown, forwarding information stored on PE2 130*b* includes, for destination MAC address a1:b1:c1:d1:e1:f1, that the next hop is the outgoing interface (ae5) connecting PE2 130*b* with CE1 115*a*. Although not shown, forwarding information stored on PE2 130*b* may also, or alternatively, include for service label L2, a pop instruction and that the next hop is the outgoing interface ae3. Further, to protect against link failure, the next hop/outgoing interface ae5 may have a defined fast reroute (FRR) which (1) pushes PE1's advertised service label (L1), (2) pushes one or more label(s) for a backup tunnel to PE1, and (3) tunnels the result to PE1.

For known unicast traffic sent by CE2 115*b* to CE1 115*a*, PE3 130*c* may load balance the traffic between PE1 130*a* and PE2 130*b*. Depending on the hash algorithm, PE3 may forward the traffic to PE1 or PE2 by using the advertised service label L1 or L2, respectively.

Referring to FIG. 2B, the FRR solution works well for single link failures at the egress. For example, in the event of a link failure between PE1 and CE1, when PE receives labeled packet (L1-PKT), it will pop label L1 (assuming MPLS-label-based disposition, or pop L1 and lookup destination MAC address if MAC-based disposition is used instead). Since the link for interface ae3 is unavailable, it will then use FRR information to (1) push label L2, (2) push one or more label(s) for a tunnel to PE2, and (3) send the result to PE2 via the tunnel. PE2 can then forward the packet to CE1 over its own link. Similarly, although not shown, in the event of a link failure between PE2 and CE1, when PE2 receives labeled packet (L2-PKT), it will pop label L2 (assuming MPLS-label-based disposition, or pop L2 and lookup destination MAC address if MAC-based disposition is used instead). Since the link for interface ae5 is unavailable, it will use FRR information to (1) push label L1, (2) push one or more label(s) for a tunnel to PE1, and (3) send the result to PE1 via the tunnel. As should be appreciated from the foregoing examples, when FRR egress link protection is used, if the link between PE1 and CE becomes unavailable, PE1 sends the known unicast traffic coming from PE3 over the bypass tunnel with label L2 after a label pop, optional MAC address lookup, label push and further label push operations. Similarly, if the link between PE2 and CE1 becomes unavailable, PE2 sends the known unicast traffic coming from PE3 over the bypass tunnel with label L1 after a label pop, optional MAC address lookup, label push and further label push operations.

However, referring to FIGS. 2C and 2D, the foregoing solution leads to looping in the event of a double link failure in which both PE1 and PE2 suffer an access link failure (or, equivalently, if CE1 fails). The following examples assume implementations with destination MAC-based disposition, but the same problem would be encountered with implementations using MPLS label-based disposition. More specifically, referring first to FIG. 2C, after receiving known unicast traffic (L1-PKT) sent from PE3, PE1 will perform a fast reroute process by (1) popping label L1, (2) looking up the MAC address, and then using FRR to (1) push label L2, (2) push the PE2_Tunnel label(s) onto the stack, and (3) send the result to PE2 via its corresponding bypass tunnel. After receiving known unicast traffic (L2-PKT) from PE1, PE2 will similarly perform a fast reroute process by (1) popping label L2, (2) looking up the MAC address, and then using FRR to (1) push label L1, (2) push the PE1_Tunnel label(s) onto the stack, and (3) send the result to PE1 via its corresponding bypass tunnel. These steps at PE1 and PE2 will be repeated until the packet's TTL expires, causing a loop.

Similarly, referring to FIG. 2D, after receiving known unicast traffic (L2-PKT) sent from PE3, PE2 will perform a fast reroute process by (1) popping label L2, (2) looking up the MAC address, and then using FRR to (1) push label L1, (2) push the PE1_Tunnel label(s) onto the stack, and (3) send the result to PE via its corresponding bypass tunnel. After receiving known unicast traffic (L1-PKT) from PE2, PE1 will similarly perform a fast reroute process by (1) popping label L1, (2) looking up the MAC address, and then using FRR to (1) push label L2, (2) push the PE2_Tunnel label(s) onto the stack, and (3) send the result to PE2 via its corresponding bypass tunnel. These steps at PE2 and PE1 will be repeated until the packet's TTL expires, causing a loop.

As can be appreciated from the foregoing examples, in the event of a double link (or CE node) failure, for traffic coming from a bypass protection tunnel, both PE1 and PE2 will alternatingly and repeatedly trigger fast reroute. This causes looping for known unicast traffic between PE1 and PE2.

When looping of known unicast traffic occurs, PE1 and PE2 can become overwhelmed with their respective fast reroute processes and with forwarding the same flow of known unicast traffic to each other in a repeated, ping-pong manner. This can greatly degrade overall network performance, and can cause the network to become very slow, malfunction, or even fail.

§ 2. SUMMARY OF THE INVENTION

In view of the foregoing discussion, it would be useful to avoid looping at the egress of a transport (e.g., EVPN) network with a multihomed CE. It would be especially useful such looping could be avoided while still satisfying any label allocation scheme (e.g., label per interface, etc.) requirements, and/or any forwarding scheme requirements. It would be especially useful if such looping could be avoided using a scalable solution.

The present inventors have recognized that since, for a given PE, the same (and only) service label is used, when the given PE receives known unicast traffic, it does not know the other PE that originated the known unicast traffic. For example, referring back to FIG. 2D, if PE2 receives known unicast traffic labeled with L2, PE2 cannot tell whether the known unicast traffic came from PE1 or PE3 (because both PE1 and PE3 use the same label; L2). Similarly, referring back to FIG. 2C, if PE1 receives known unicast traffic labeled with L1, PE1 cannot tell whether the known unicast traffic came from PE2 or PE3 (because both PE2 and PE3 use the same label; L1). Recall from FIG. 2B that in the case of a single access link failure, this lack of knowledge by the receiving egress PE is not an issue because the receiving egress PE (e.g., PE1 or PE2) only needs to forward the traffic to CE1.

The problem of looping at the egress of a transport (e.g., EVPN) network with a CE multihomed to a protected egress PE and a backup/protector egress PE can be avoided by enabling the protector egress PE to distinguish between fast reroute (FRR) traffic coming from the protected egress PE and normal known unicast (KU) traffic coming from another PE of the EVPN. When the protector egress PE receives known unicast data to be forwarded to the CE, if the protector egress PE determines that the link between it and the CE is unavailable, it (1) determines (e.g., based on a presence or absence of a multihomed peer protection (MPP) label in the known unicast traffic) whether the known unicast traffic received was sent from the protected egress PE or from another PE of the EVPN, and (2) responsive to a determination that the known unicast traffic received was sent from the protected egress PE, the protector egress PE discards the known unicast traffic received. Otherwise, responsive to a determination that the known unicast (KU) traffic received was sent from another PE of the EVPN, the protector egress PE sends the known unicast traffic, via a backup tunnel, to an egress PE which protects the protector egress PE.

In some example implementations, the act of enabling the protector egress PE to distinguish between fast reroute (FRR) traffic coming from the protected egress PE and normal known unicast (KU) traffic coming from another PE of the EVPN includes (1) allocating, by the protector egress PE, a first (known unicast, or KU) service label (which might or might not be associated with a particular CE) for known unicast (KU) traffic, and a second (multihomed peer protection (MPP)) label indicating that the protected egress PE used fast reroute (FRR), and (2) advertising, by the protector egress PE, the allocated first service (KU) label and the second (MPP) label, to at least the protected egress PE. (Note that in this example, there is only one MPP allocated, regardless of how many multihomed CE devices an EVPN PE has.) In response to receiving such an advertisement, the protected egress PE creates forwarding state for the backup path for fast reroute, such that, upon link failure between the protected egress PE and the CE, the protected egress PE processes incoming KU traffic for forwarding to the protector egress PE by (1) popping the incoming KU (service) label, (2) pushing the second (MPP) label, that was received from the protector egress PE, onto the KU traffic to generate first labeled KU traffic, (3) pushing the first (KU) label, that was received from the protector egress PE, onto the updated KU traffic to generate second labeled KU traffic, (4) pushing a transport label or transport label stack associated with a backup transport tunnel to the protector egress PE to generate encapsulated, second labeled KU traffic, and (5) sending, by the protected egress PE, the encapsulated, second labeled KU traffic to the protector egress PE via the backup transport tunnel.

In some implementations, the (MPP) label is allocated on a per Ethernet VPN (EVI) basis, regardless of how many multihomed Ethernet Segments the protector egress PE is locally attached to.

In some implementations, the second (MPP) label is advertised through a per Ethernet_Segment_Ethernet_Auto_Discovery route with a zero Ethernet Segment identifier (ESI) value and with at least one Route Target (RT) belonging to the EVI that the protector egress PE belongs to.

In some implementations, the protector egress PE supports, for its known unicast traffic, at least one of (A) a label per EVI label allocation scheme, (B) a per BD label allocation scheme, or (C) a per (multihomed) ES label allocation scheme. Depending on the label allocation scheme and the PE's capability, a PE may support MPLS label-based lookup (MPLS-label-based disposition) or MPLS label plus MAC lookup (MAC-based-disposition) to send a known traffic to its final destination.

§ 3. BRIEF DESCRIPTION OF THE DRAWINGS

FIG. 1 illustrates a CE having multihomed access to an example transport network.

FIG. 2A illustrates bypass paths configured on egress PEs of the example transport network of FIG. 1. FIG. 2B illustrates the use of a bypass path in the event of a single link failure. FIGS. 2C and 2D illustrate the problem of looping in the event of a double link failure (or a single CE failure).

FIGS. 8A and 8B illustrate example packet forwarding operations of the example distributed ASICs of FIG. 7.

§ 4. DETAILED DESCRIPTION

The present disclosure may involve novel methods, apparatus, message formats, and/or data structures for avoiding looping at the egress of a transport network (such as communications networks that employ FRR) with a multihomed CE. The following description is presented to enable one skilled in the art to make and use the described embodiments, and is provided in the context of particular applications and their requirements. Thus, the following description of example embodiments provides illustration and description, but is not intended to be exhaustive or to limit the present disclosure to the precise form disclosed. Various modifications to the disclosed embodiments will be apparent to those skilled in the art, and the general principles set forth below may be applied to other embodiments and applications. For example, although a series of acts may be described with reference to a flow diagram, the order of acts may differ in other implementations when the performance of one act is not dependent on the completion of another act. Further, non-dependent acts may be performed in parallel. No element, act or instruction used in the description should be construed as critical or essential to the present description unless explicitly described as such. Also, as used herein, the article "a" is intended to include one or more items. Where only one item is intended, the term "one" or similar language is used. Thus, the present disclosure is not intended to be limited to the embodiments shown and the inventors regard their invention as any patentable subject matter described.

§ 4.1 Example Methods

Figure 2A:
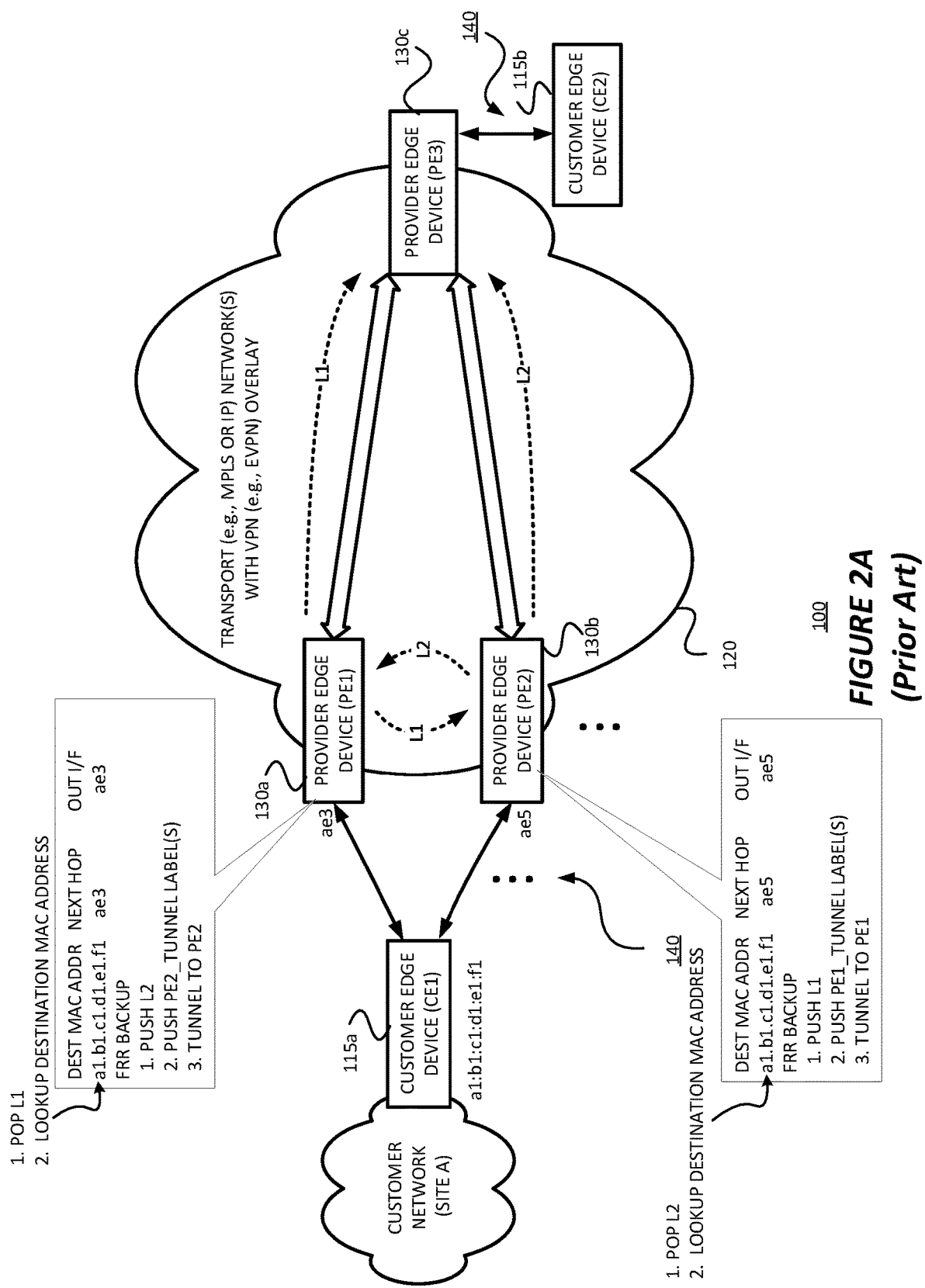
Figure 2C:
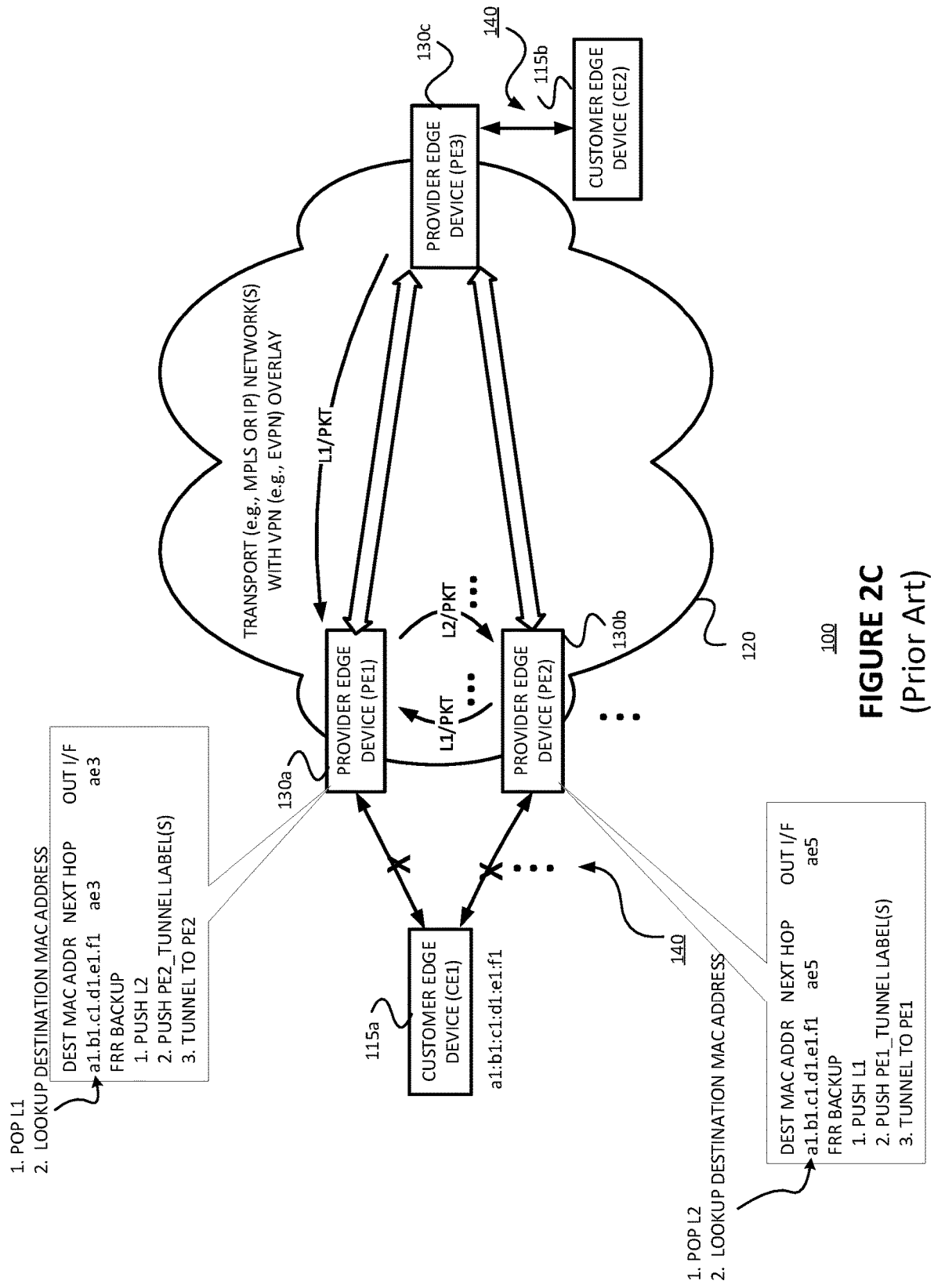
Figure 2D:
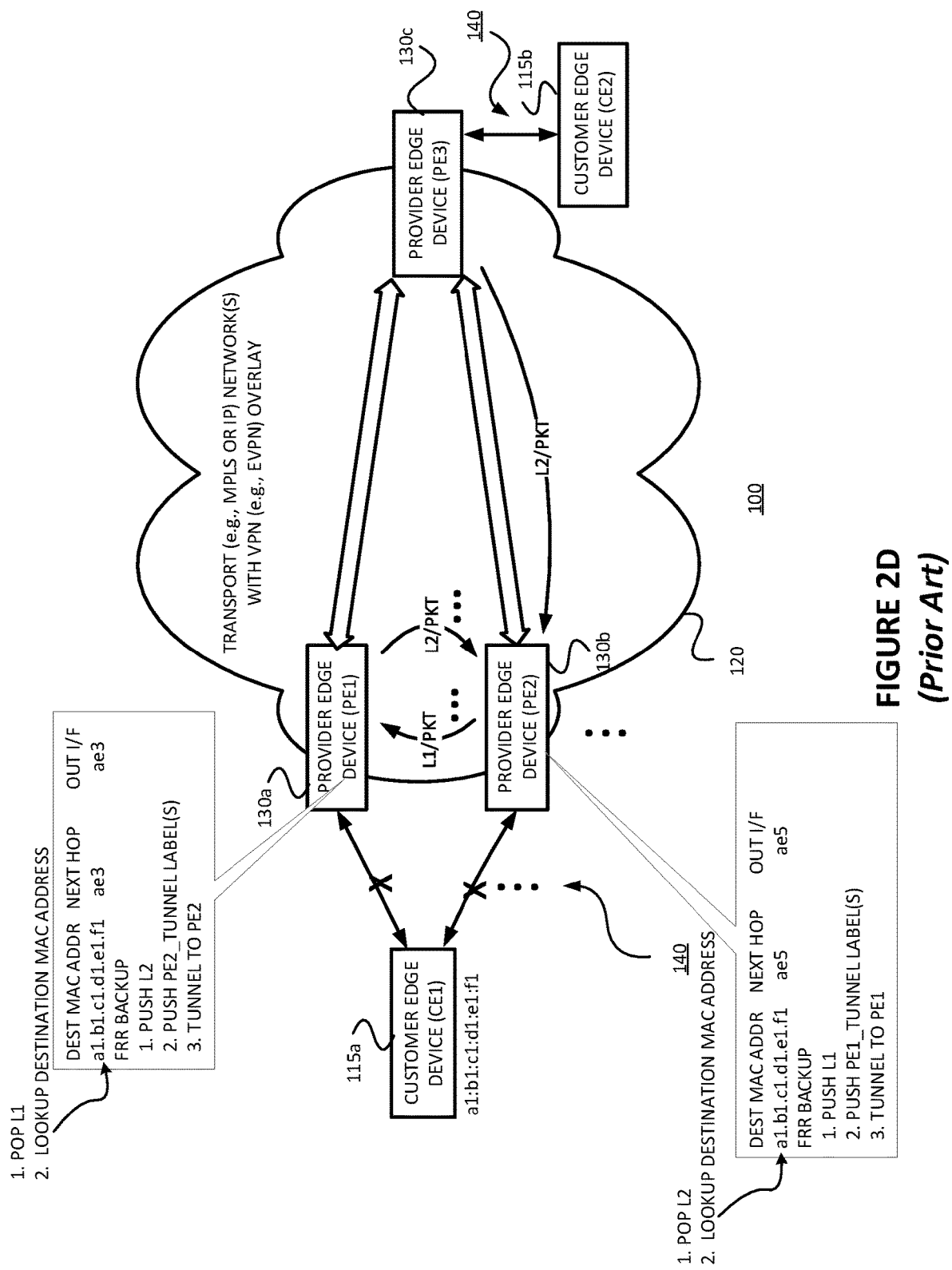
Figure 3:
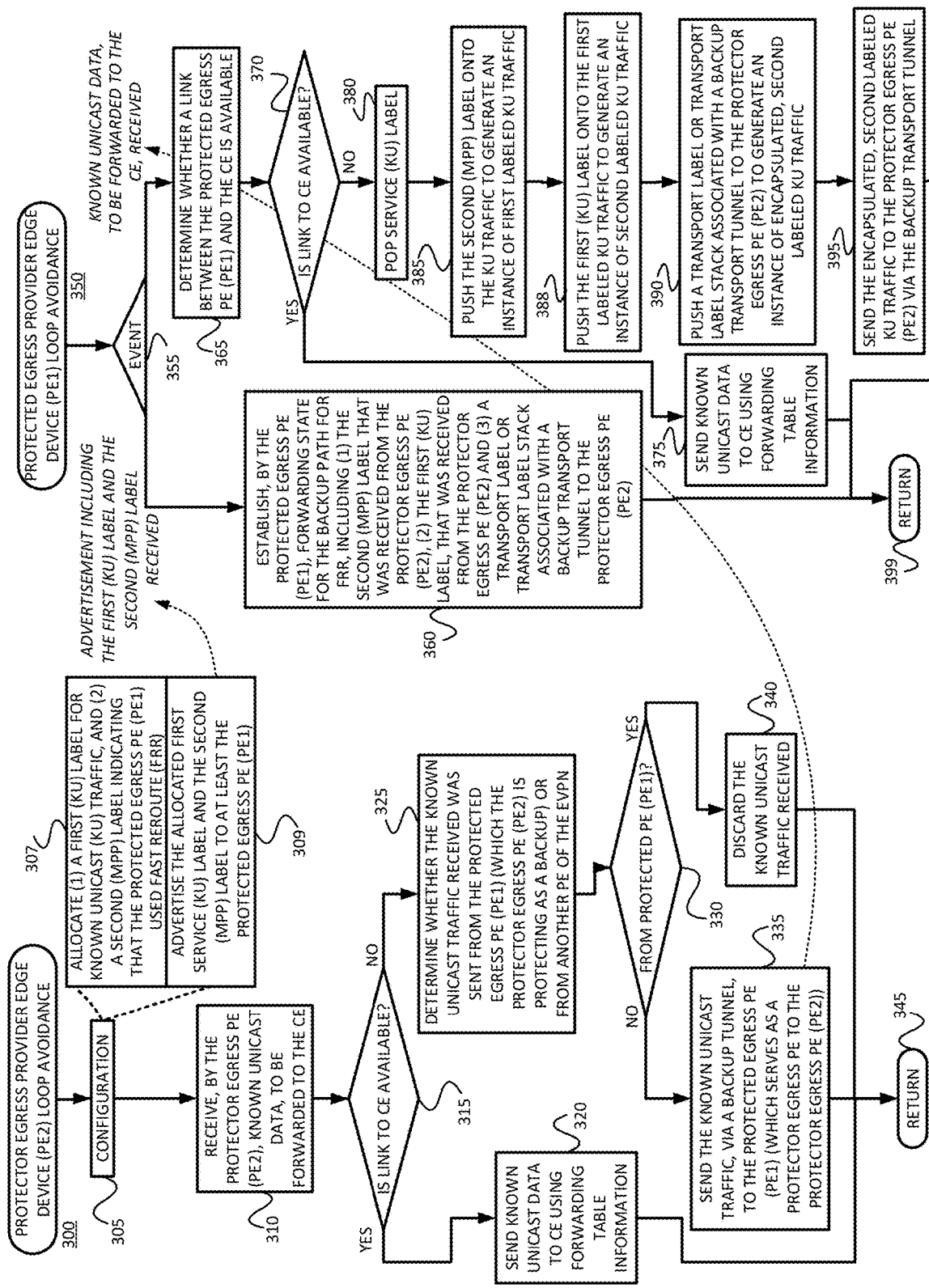
FIG. 3 is a flow diagram of an example method (including two example methods) for avoiding looping at the egress of a transport network with a multihomed CE.

FIG. 3 is a flow diagram of an example method (including two methods 300 and 350) for avoiding looping of known unicast (KU) traffic at the egress of a transport (e.g., EVPN) network with a multihomed CE. A second egress PE (PE2) acts as a backup (also referred to as "protector") egress PE to a first egress PE (PE1) (also referred to as the "protected" egress PE). Further, although only alluded to in block 335, the first egress PE (PE1) may acts as a backup egress PE (referred to as "protector" PE) to the second egress PE (PE2). The example method 300 is performed by the protector egress PE, while the example method 350 is performed by the protected egress PE. Generally speaking, the example methods 300 and 350 collectively permit the protector egress PE to distinguish between (A) fast reroute (FRR) traffic coming from the protected egress PE it protects and (B) normal known unicast (KU) traffic coming from another PE of the EVPN.

Referring first to the example method 300, the protector egress PE performs configuration. (Block 305) As shown, this configuration may include (1) allocating, by the protector egress PE, a first (known unicast, or KU) service label for known unicast (KU) traffic, and a second (multihomed peer protection, or MPP) label indicating that the protected egress PE used fast reroute (FRR) to send the known unicast data to the protector egress PE (Block 307), and (2) advertising, by the protector egress PE, the allocated first service (KU) label and the second (MPP) label to at least the protected egress PE (Block 309).

Referring next to the example method 350, the protected egress PE may perform different branches of the example method 350 responsive to the occurrence of different events. (Event Branch Point 355) For example, responsive to receiving an advertisement including the first (KU) label and the second (MPP) label, the example method 350 may establish, by the protected egress PE, forwarding state for the backup path for fast reroute, including (1) the second (MPP) label from the advertisement, (2) the first (KU) label from the advertisement, and (3) a transport label or label stack associated with a backup transport tunnel to the protector egress PE. (Block 360) This forwarding information may be used in the event of an unavailable link when known unicast data to be forwarded to the multihomed CE is received.

More specifically, referring back to event branch point 355, responsive to receiving known unicast data to be forwarded to the CE, the example method 350 determines whether or not a link between the protected egress PE and the CE is available. (Block 365) If, on the one hand, the link is available (Decision 370=YES), the known unicast data is sent to the CE (over the available link) using forwarding table information (Block 375), before the example method 350 is left (Node 399). If, on the other hand, the link is not available (Decision 370=NO), the protected egress PE processes the incoming KU traffic for forwarding to the protector egress PE (which acts as its backup) by (1) popping the KU (service) label (Block 380), (2) pushing the second (MPP) label onto the KU traffic to generate first labeled KU traffic (Block 385), (3) pushing the first (KU) label onto the updated KU traffic to generate second labeled KU traffic (Block 388), (4) pushing a transport label or transport label stack associated with a backup transport tunnel to the protector egress PE to generate encapsulated, second labeled KU traffic (Block 390), and (5) sending the encapsulated, second labeled KU traffic to the protector egress PE via the backup transport tunnel (Block 395), before the example method 350 is left (Node 399).

Thus, for FRR to protect egress link failure, an egress PE selects one of its peer multihomed PEs as its backup (or "protector") egress PE. To keep the same label allocation scheme and the same forwarding scheme for known unicast traffic at the backup/protector egress PE, when setting up the backup path, the protected egress PE also uses the service label (i.e. the known unicast (KU) label) advertised by the backup/protector egress PE in addition to the MPP label. To establish the forwarding state for the backup path for fast reroute, the protected egress PE will send the incoming KU traffic to its backup/protector egress PE by: (1) popping the incoming KU (service) label (Recall block 380); (2) pushing the MPP label advertised by its peer multihomed PE (inner most) (Recall block 385); (3) pushing the KU label advertised by its peer multihomed PE (Recall block 388); and (4) pushing the transport label or label stack for the transport tunnel (Recall block 390). Based on the presence or absence of the MPP label, the backup/protector egress PE will be able to determine whether the traffic came from its protected egress PE or another PE of the EVPN.

Referring back to example method 300, assume the protector egress PE receives known unicast data to be forwarded to the multihomed CE. (Block 310) The example method 300 determines whether or not a link between it and the CE is available. If, on the one hand, the link is available (Decision 315=YES), the known unicast data is sent to the CE (over the available link) using forwarding table information (Block 320), before the example method 300 is left (Node 345). If, on the other hand, it is determined that the link between the protector egress PE and the CE is unavailable (Decision 315=NO), the example method 300 next determines whether or not the known unicast traffic received was sent from the protected egress PE (e.g., as FRR traffic), or from another PE of the EVPN. (Block 325) If, on the one hand, the received known unicast traffic was received from a PE other than the protected PE (Decision 330=NO), the known unicast traffic is sent, via a backup tunnel, to a PE which acts as a protector egress PE to the protector egress PE (Block 335) before the example method 300 is left (Node 345). Recall that the PEs to which the CE is multihomed may serve as protectors to one another. That is, PE2 may act as a protector egress PE to protected egress PE1, and PE1 may act as a protector egress PE to protected egress PE2. Therefore, at least two egress PEs may each perform both example method 300 and example method 350. Referring back to decision 330, if, on the other hand, it has been determined that the known unicast traffic received was sent from the protected egress PE, it is discarded (Block 340), before the example method 300 is left (Node 345). In this way, known unicast data that has already been subject to FRR at the egress of the EVPN, is not subject to another FRR (thereby avoiding looping at the egress of the EVPN).

Referring back to block 325, in some example implementations of the example method 300, the act of determining whether the known unicast traffic received was sent from the protected egress PE or from another PE of the transport network may be done based on the presence or absence of the second type (MPP) of label in the known unicast traffic.

Referring back to block 340, in some example implementations of the example method 300, the known unicast traffic that was received from the protected PE may be dropped using a split horizon rule.

Referring back to block 307, in some example implementations of the example method 300, the second (MPP) label is allocated on a per Ethernet VPN (EVI) basis, regardless of how many multihomed Ethernet Segments the second egress PE is locally attached to.

Referring back to block 309, in some example implementations of the example method 300, the second (MPP) label is advertised through a per Ethernet_Segment_Ethernet_Auto_Discovery route with a zero Ethernet Segment identifier (ESI) value and with at least one Route Target (RT) belonging to the EVI that the protector egress PE belongs to.

In some example implementations of the example method 300, the protector egress PE supports, for its known unicast traffic, at least one of (A) a label per EVI label allocation scheme, (B) a per BD label allocation scheme, or (C) a per (multihomed) ES label allocation scheme. Depending on the label allocation scheme and the PE's capability, a PE may support MPLS label-based lookup (MPLS-label-based disposition) or MPLS label plus MAC lookup (MAC-based disposition) to send a known traffic to its final destination.

§ 4.2 Example Operations of Example Method

Figure 4:
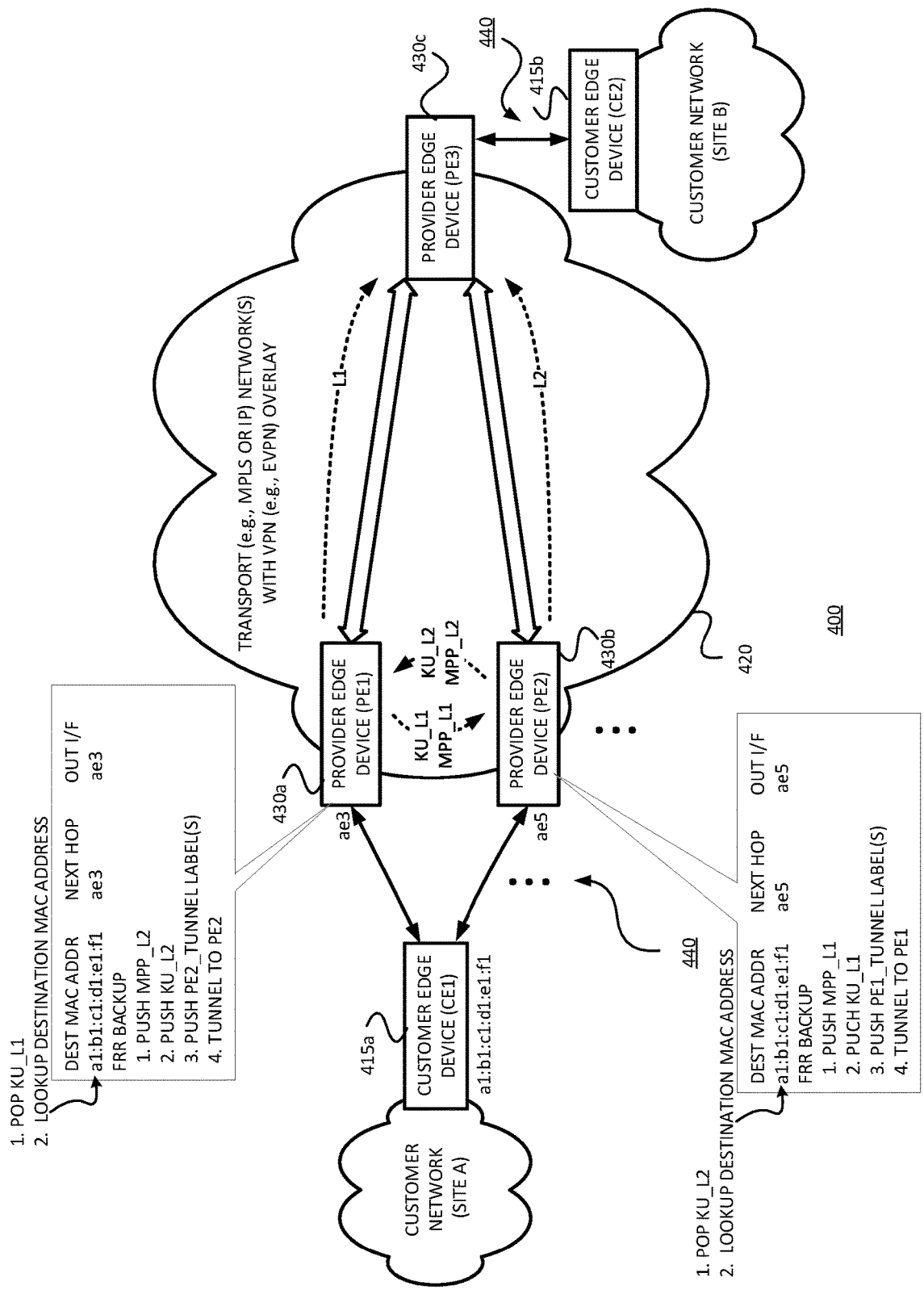
FIG. 4 illustrates operations of the example method(s) of FIG. 3 in the context of the network of FIG. 1.

FIG. 4 illustrates operations of the example methods 300 and 350 of FIG. 3 in the context of the network of FIG. 1. In FIG. 4, the example topology 400 includes a transport network (e.g., with an EVPN overlay) 420 and links 440 which serve to "stitch" together site A and site B of a (e.g., layer 2, Ethernet) customer network. The transport network 420 includes provider edge devices PE1 430*a*, PE2 430*b* and PE3 430*c*. Customer edge device CE1 415*a* is multihomed (via links 440) with the transport network 420 via PE1 and PE2, and customer edge device CE2 415*b* is linked (via a link 440) with PE3.

In this example, PE1 acts as an egress protector (e.g., as a backup) to PE2 for traffic to be sent via CE1. More specifically, PE1 allocates labels KU_L1 and MPP_L1 (Recall, e.g., block 307 of FIG. 3.) and advertises these labels to at least PE2 (Recall, e.g., block 309 of FIG. 3). PE2 uses the information in this advertisement to create a FRR backup in its forwarding table as shown. (Recall, e.g., block 360 of FIG. 3.) For example, for destination MAC address a1:b1:c1:d1:e1:f1, the next hop address is the out interface (ae5) associated with the link 440 to CE1. The FRR backup includes the following operations: (1) pop label KU_L2; (2) push label MPP_L1; (3) push label KU_L1; (4) push PE tunnel label(s); and (5) send to PE1 via the tunnel.

Similarly, PE2 acts as an egress protector (e.g., as a backup) to PE1 for traffic to be sent via CE1. More specifically, PE2 allocates labels KU_L2 and MPP_L2 (Recall, e.g., block 307 of FIG. 3) and advertises these labels to at least PE1 (Recall, e.g., block 309 of FIG. 3). PE1 uses the information in this advertisement to create a FRR backup in its forwarding table as shown. (Recall, e.g., block 360) of FIG. 3.) For example, for destination MAC Address 1a:1b:1c:1d:1e:1f, the next hop is the out interface (ae3) associated with the link to CE1. The FRR backup includes the following operations: (1) pop label KU_L1; (2) push label MPP_L2; (3) push label KU_L2; (4) push PE2 tunnel label(s); and (5) send to PE2 via the tunnel.

As should be appreciated, if PE1 receives known unicast traffic with label MPP_L1, it knows that such known unicast traffic was subject to a FRR (by its multihomed peer PE2, though it could be from another multihomed peer if there were more than two). If the link to CE1 is unavailable, this known unicast traffic is dropped. (Recall, e.g., 310, 315=NO, 325, 330=YES and 340 of FIG. 3.) In this way, looping of the known unicast data between the egress PEs is prevented. Note that if the link between PE1 and CE is available, the known unicast traffic is forwarded over the available link to CE1. (Recall, e.g., 315=YES and 320 of FIG. 3.) This latter case corresponds to a single link failure.

Similarly, if PE2 receives known unicast traffic with label MPP_L2, it knows that such known unicast traffic was subject to a FRR (by its multihomed peer PE1, though it could be from another multihomed peer if there were more than two). If the link to CE1 is unavailable, this known unicast traffic is dropped. (Recall, e.g., 310, 315=NO, 325, 330=YES and 340 of FIG. 3.) In this way, looping of the known unicast data between the egress PEs is prevented. Note that if the link between PE2 and CE is available, the known unicast traffic is forwarded over the available link to CE1. (Recall, e.g., 315=YES and 320 of FIG. 3.) This latter case corresponds to a single link failure.

§ 4.3 Example Apparatus

Figure 5:
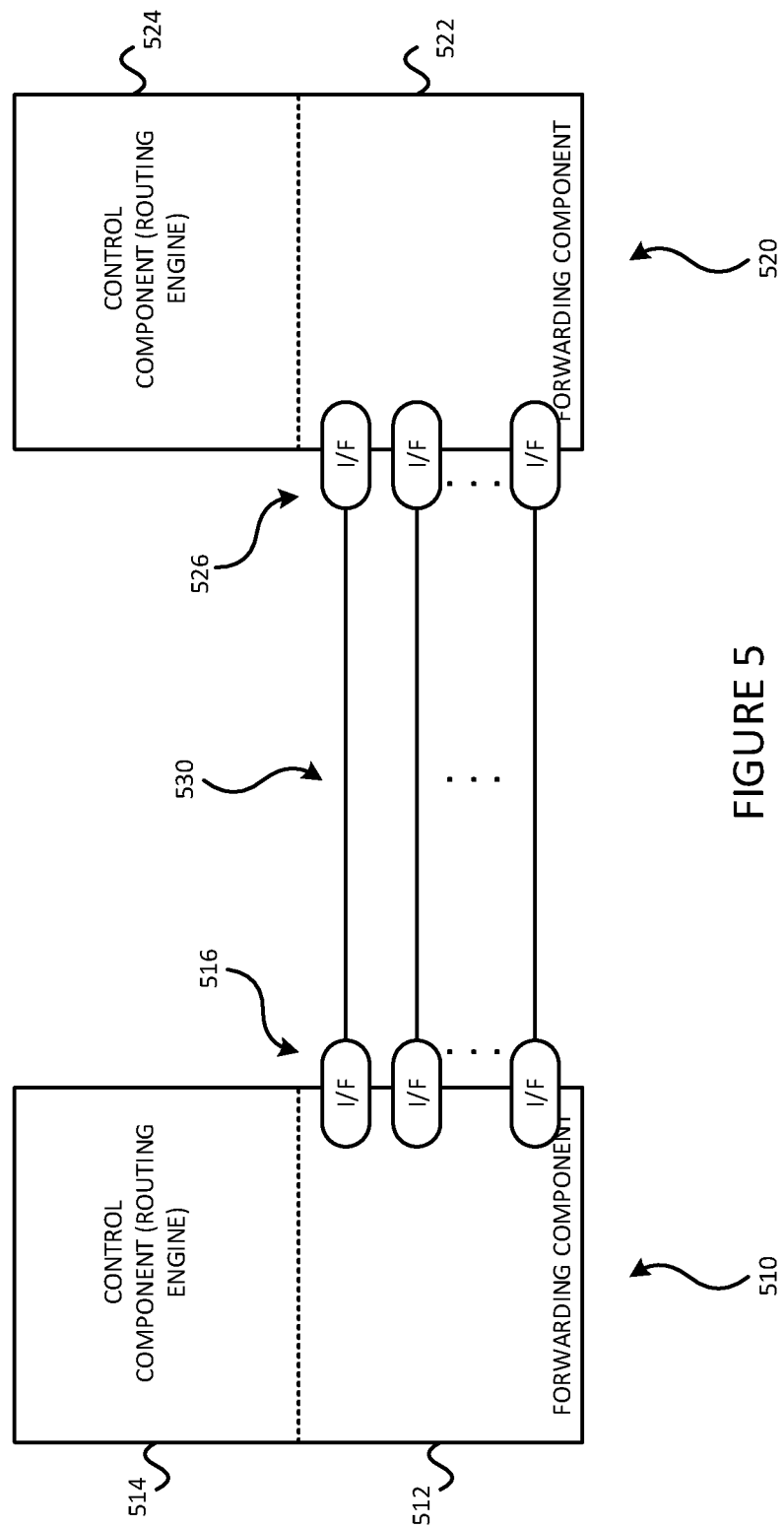
FIG. 5 illustrates an example environment including two systems coupled via communications links.

The data communications network nodes (e.g., PEs, Ps, ASBRs, etc.) may be forwarding devices, such as routers for example. FIG. 5 illustrates two data forwarding systems 510 and 520 coupled via communications links 530. The links may be physical links or "wireless" links. The data forwarding systems 510,520 may be routers for example. If the data forwarding systems 510,520 are example routers, each may include a control component (e.g., a routing engine) 514,524 and a forwarding component 512,522. Each data forwarding system 510,520 includes one or more interfaces 516,526 that terminate one or more communications links 530.

As just discussed above, and referring to FIG. 6, some example routers 600 include a control component (e.g., routing engine) 610 and a packet forwarding component (e.g., a packet forwarding engine) 690.

The control component 610 may include an operating system (OS) kernel 620, routing protocol process(es) 630, label-based forwarding protocol process(es) 640, interface process(es) 650, user interface (e.g., command line interface) process(es) 660, and chassis process(es) 670, and may store routing table(s) 639, label forwarding information 649, and forwarding (e.g., route-based and/or label-based) table(s) 680. As shown, the routing protocol process(es) 630 may support routing protocols such as the routing information protocol ("RIP") 631, the intermediate system-to-intermediate system protocol ("IS-IS") 632, the open shortest path first protocol ("OSPF") 633, the enhanced interior gateway routing protocol ("EIGRP") 634 and the border gateway protocol ("BGP") 635, and the label-based forwarding protocol process(es) 640 may support protocols such as BGP 635, the label distribution protocol ("LDP") 641, the resource reservation protocol ("RSVP") 642, Ethernet virtual private network (EVPN) 643, layer 2 (L2) VPN 644 and segment routing (SR) 645. One or more components (not shown) may permit a user 665 to interact with the user interface process(es) 660. Similarly, one or more components (not shown) may permit an outside device to interact with one or more of the router protocol process(es) 630, the label-based forwarding protocol process(es) 640, the interface process(es) 650, and the chassis process(es) 670, via SNMP 685, and such processes may send information to an outside device via SNMP 685.

The packet forwarding component 690 may include a microkernel 692 over hardware components (e.g., ASICs, switch fabric, optics, etc.) 691, interface process(es) 693, distributed ASICs 694, chassis process(es) 695 and forwarding (e.g., route-based and/or label-based) table(s) 696.

Figure 6:
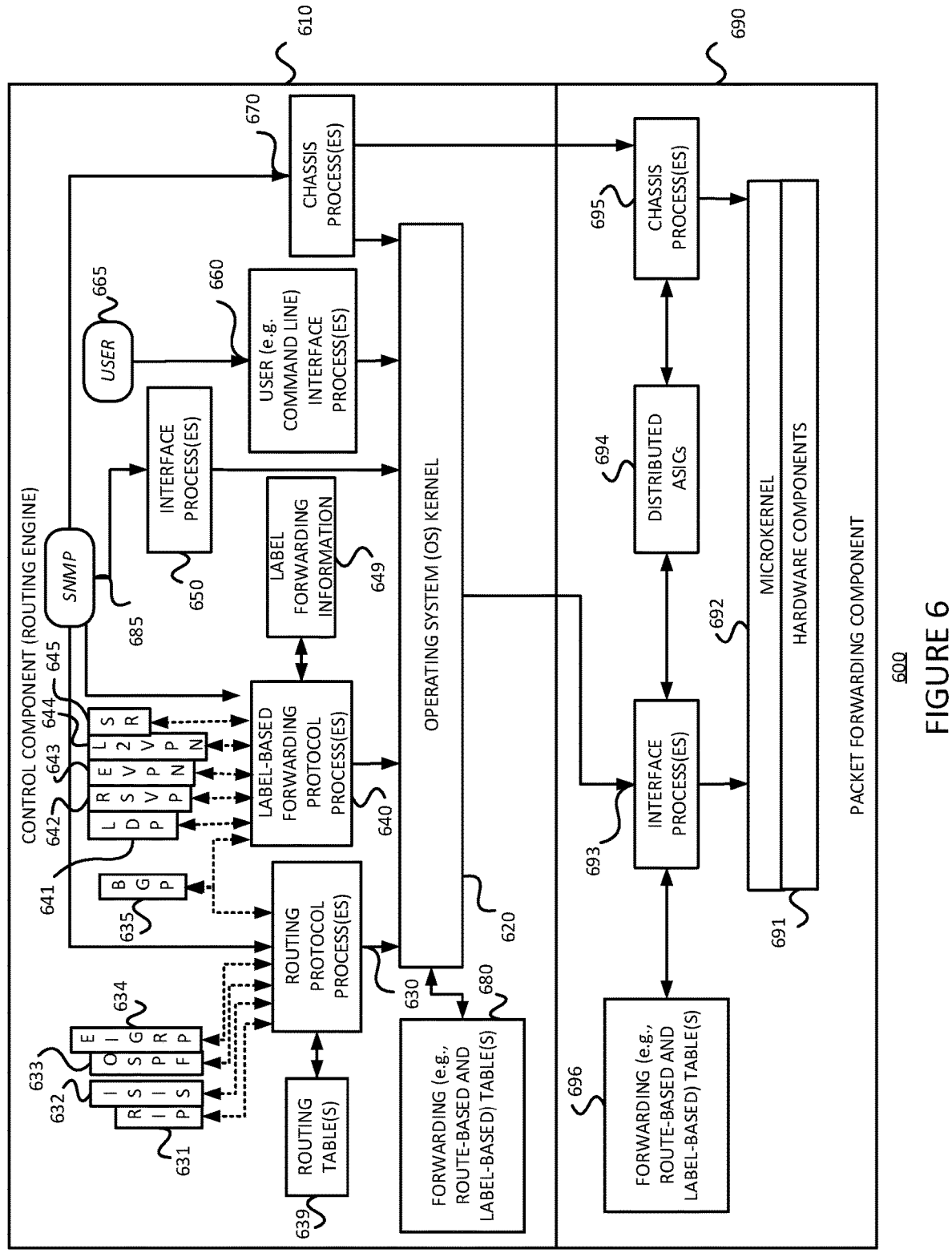
FIG. 6 is a block diagram of an example router on which one or more aspects of the present disclosure may be implemented.

In the example router 600 of FIG. 6, the control component 610 handles tasks such as performing routing protocols, performing label-based forwarding protocols, control packet processing, etc., which frees the packet forwarding component 690 to forward received packets quickly. That is, received control packets (e.g., routing protocol packets and/or label-based forwarding protocol packets) are not fully processed on the packet forwarding component 690 itself, but are passed to the control component 610, thereby reducing the amount of work that the packet forwarding component 690 has to do and freeing it to process packets to be forwarded efficiently. Thus, the control component 610 is primarily responsible for running routing protocols and/or label-based forwarding protocols, maintaining the routing tables and/or label forwarding information, sending forwarding table updates to the packet forwarding component 690, and performing system management. The example control component 610 may handle routing protocol packets, provide a management interface, provide configuration management, perform accounting, and provide alarms. The processes 630, 640, 650, 660 and 670 may be modular, and may interact with the OS kernel 620. That is, nearly all of the processes communicate directly with the OS kernel 620. Using modular software that cleanly separates processes from each other isolates problems of a given process so that such problems do not impact other processes that may be running. Additionally, using modular software facilitates easier scaling.

Still referring to FIG. 6, the example OS kernel 620 may incorporate an application programming interface ("API") system for external program calls and scripting capabilities. The control component 610 may be based on an Intel PCI platform running the OS from flash memory, with an alternate copy stored on the router's hard disk. The OS kernel 620 is layered on the Intel PCI platform and establishes communication between the Intel PCI platform and processes of the control component 610. The OS kernel 620 also ensures that the forwarding tables 696 in use by the packet forwarding component 690 are in sync with those 680 in the control component 610. Thus, in addition to providing the underlying infrastructure to control component 610 software processes, the OS kernel 620 also provides a link between the control component 610 and the packet forwarding component 690.

Referring to the routing protocol process(es) 630 of FIG. 6, this process(es) 630 provides routing and routing control functions within the platform. In this example, the RIP 631, ISIS 632, OSPF 633 and EIGRP 634 (and BGP 635) protocols are provided. Naturally, other routing protocols may be provided in addition, or alternatively. Similarly, the label-based forwarding protocol process(es) 640 provides label forwarding and label control functions. In this example, the LDP 641, RSVP 642, EVPN 643, L2VPN 644 and SR 645 (and BGP 635) protocols are provided. Naturally, other label-based forwarding protocols (e.g., MPLS, etc.) may be provided in addition, or alternatively. In the example router 600, the routing table(s) 639 is produced by the routing protocol process(es) 630, while the label forwarding information 649 is produced by the label-based forwarding protocol process(es) 640.

Still referring to FIG. 6, the interface process(es) 650 performs configuration of the physical interfaces and encapsulation.

The example control component 610 may provide several ways to manage the router. For example, it 610 may provide a user interface process(es) 660 which allows a system operator 665 to interact with the system through configuration, modifications, and monitoring. The SNMP 685 allows SNMP-capable systems to communicate with the router platform. This also allows the platform to provide necessary SNMP information to external agents. For example, the SNMP 685 may permit management of the system from a network management station running software, such as Hewlett-Packard's Network Node Manager ("HP-NNM"), through a framework, such as Hewlett-Packard's OpenView. Accounting of packets (generally referred to as traffic statistics) may be performed by the control component 610, thereby avoiding slowing traffic forwarding by the packet forwarding component 690.

Although not shown, the example router 600 may provide for out-of-band management, RS-232 DB9 ports for serial console and remote management access, and tertiary storage using a removable PC card. Further, although not shown, a craft interface positioned on the front of the chassis provides an external view into the internal workings of the router. It can be used as a troubleshooting tool, a monitoring tool, or both. The craft interface may include LED indicators, alarm indicators, control component ports, and/or a display screen. Finally, the craft interface may provide interaction with a command line interface ("CLI") 660 via a console port, an auxiliary port, and/or a management Ethernet port.

The packet forwarding component 690 is responsible for properly outputting received packets as quickly as possible. If there is no entry in the forwarding table for a given destination or a given label and the packet forwarding component 690 cannot perform forwarding by itself, it 690 may send the packets bound for that unknown destination off to the control component 610 for processing. The example packet forwarding component 690 is designed to perform Layer 2 and Layer 3 switching, route lookups, and rapid packet forwarding.

As shown in FIG. 6, the example packet forwarding component 690 has an embedded microkernel 692 over hardware components 691, interface process(es) 693, distributed ASICs 694, and chassis process(es) 695, and stores a forwarding (e.g., route-based and/or label-based) table(s) 696. The microkernel 692 interacts with the interface process(es) 693 and the chassis process(es) 695 to monitor and control these functions. The interface process(es) 692 has direct communication with the OS kernel 620 of the control component 610. This communication includes forwarding exception packets and control packets to the control component 610, receiving packets to be forwarded, receiving forwarding table updates, providing information about the health of the packet forwarding component 690 to the control component 610, and permitting configuration of the interfaces from the user interface (e.g., CLI) process(es) 660 of the control component 610. The stored forwarding table(s) 696 is static until a new one is received from the control component 610. The interface process(es) 693 uses the forwarding table(s) 696 to look up next-hop information. The interface process(es) 693 also has direct communication with the distributed ASICs 694. Finally, the chassis process(es) 695 may communicate directly with the microkernel 692 and with the distributed ASICs 694.

Figure 7:
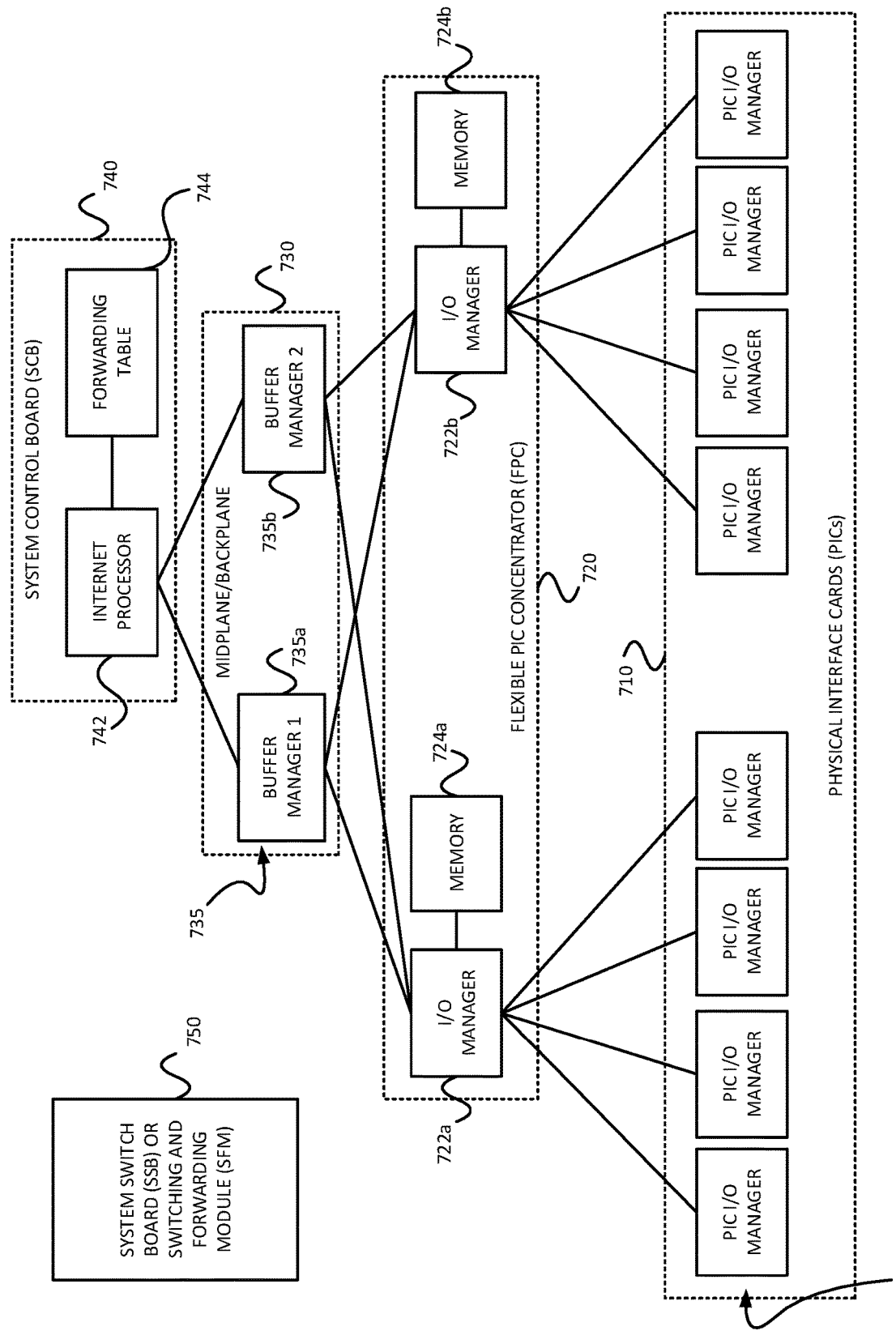
FIG. 7 is a block diagram of example distributed application specific integrated circuits ("ASICs") that may be provided in the example router of FIG. 6.

FIG. 7 is an example of how the ASICS may be distributed in the packet forwarding component 690 to divide the responsibility of packet forwarding. As shown in FIG. 7, the ASICs of the packet forwarding component 690 may be distributed on physical interface cards ("PICs") 710, flexible PIC concentrators ("FPCs") 720, a midplane or backplane 730, and a system control board(s) 740 (for switching and/or forwarding). Switching fabric is also shown as a system switch board ("SSB"), or a switching and forwarding module ("SFM") 750. Each of the PICs 710 includes one or more PIC I/O managers 715. Each of the FPCs 720 includes one or more I/O managers 722, each with an associated memory 724. The midplane/backplane 730 includes buffer managers 735a, 735b. Finally, the system control board 740 includes an internet processor 742 and an instance of the forwarding table 744 (Recall, e.g., 696 of FIG. 6).

Still referring to FIG. 7, the PICs 710 contain the interface ports. Each PIC 710 may be plugged into an FPC 720. Each individual PIC 710 may contain an ASIC that handles media-specific functions, such as framing or encapsulation. Some example PICs 710 provide SDH/SONET, ATM, Gigabit Ethernet, Fast Ethernet, and/or DS3/E3 interface ports.

An FPC 720 can contain from one or more PICs 710, and may carry the signals from the PICs 710 to the midplane/backplane 730 as shown in FIG. 7.

The midplane/backplane 730 holds the line cards. The line cards may connect into the midplane/backplane 730 when inserted into the example router's chassis from the front. The control component (e.g., routing engine) 610 may plug into the rear of the midplane/backplane 730 from the rear of the chassis. The midplane/backplane 730 may carry electrical (or optical) signals and power to each line card and to the control component 610.

The system control board 740 may perform forwarding lookup. It 740 may also communicate errors to the routing engine. Further, it 740 may also monitor the condition of the router based on information it receives from sensors. If an abnormal condition is detected, the system control board 740 may immediately notify the control component 610.

Referring to FIGS. 7, 8A and 8B, in some exemplary routers, each of the PICs 710,610' contains at least one I/O manager ASIC 715 responsible for media-specific tasks, such as encapsulation. The packets pass through these I/O ASICs on their way into and out of the router. The I/O manager ASIC 715 on the PIC 710,610' is responsible for managing the connection to the I/O manager ASIC 722 on the FPC 720,620', managing link-layer framing and creating the bit stream, performing cyclical redundancy checks (CRCs), and detecting link-layer errors and generating alarms, when appropriate. The FPC 720 includes another I/O manager ASIC 722. This ASIC 722 takes the packets from the PICs 710 and breaks them into (e.g., 74-byte) memory blocks. This FPC I/O manager ASIC 722 sends the blocks to a first distributed buffer manager (DBM) 735a', decoding encapsulation and protocol-specific information, counting packets and bytes for each logical circuit, verifying packet integrity, and applying class of service (CoS) rules to packets. At this point, the packet is first written to memory. More specifically, the example DBM ASIC 735a' manages and writes packets to the shared memory 724 across all FPCs 720. In parallel, the first DBM ASIC 735a' also extracts information on the destination of the packet and passes this forwarding-related information to the Internet processor 742/642'. The Internet processor 742/642' performs the route lookup using the forwarding table 744 and sends the information over to a second DBM ASIC 735b'. The Internet processor ASIC 742/642' also collects exception packets (i.e., those without a forwarding table entry) and sends them to the control component 610. The second DBM ASIC 735b' then takes this information and the 74-byte blocks and forwards them to the I/O manager ASIC 722 of the egress FPC 720/620' (or multiple egress FPCs, in the case of multicast) for reassembly. (Thus, the DBM ASICs 735a' and 735b' are responsible for managing the packet memory 724 distributed across all FPCs 720/620', extracting forwarding-related information from packets, and instructing the FPC where to forward packets.)

The I/O manager ASIC 722 on the egress FPC 720/620' may perform some value-added services. In addition to incrementing time to live ("TTL") values and re-encapsulating the packet for handling by the PIC 710, it can also apply class-of-service (CoS) rules. To do this, it may queue a pointer to the packet in one of the available queues, each having a share of link bandwidth, before applying the rules to the packet. Queuing can be based on various rules. Thus, the I/O manager ASIC 722 on the egress FPC 720/620' may be responsible for receiving the blocks from the second DBM ASIC 735b', incrementing TTL values, queuing a pointer to the packet, if necessary, before applying CoS rules, re-encapsulating the blocks, and sending the encapsulated packets to the PIC I/O manager ASIC 715.

Figure 9:
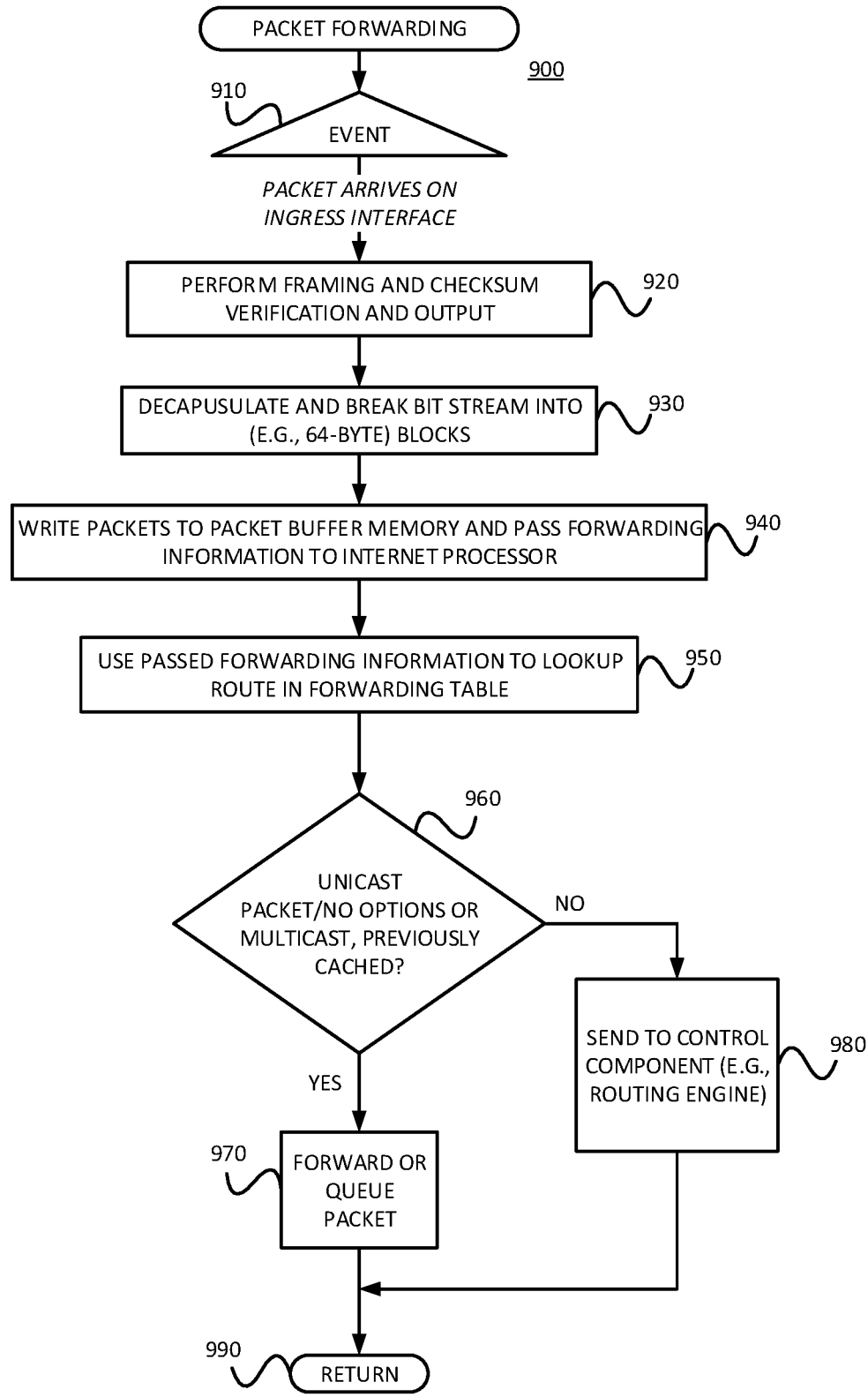
FIG. 9 is a flow diagram of an example packet forwarding method that may be implemented on any of the example routers of FIGS. 6 and 7.

FIG. 9 is a flow diagram of an example method 900 for providing packet forwarding in the example router. The main acts of the method 900 are triggered when a packet is received on an ingress (incoming) port or interface. (Event 910) The types of checksum and frame checks that are required by the type of medium it serves are performed and the packet is output, as a serial bit stream. (Block 920) The packet is then decapsulated and parsed into (e.g., 64-byte) blocks. (Block 930) The packets are written to buffer memory and the forwarding information is passed on the Internet processor. (Block 940) The passed forwarding information is then used to lookup a route in the forwarding table. (Block 950) Note that the forwarding table can typically handle unicast packets that do not have options (e.g., accounting) set, and multicast packets for which it already has a cached entry. Thus, if it is determined that these conditions are met (YES branch of Decision 960), the packet forwarding component finds the next hop and egress interface, and the packet is forwarded (or queued for forwarding) to the next hop via the egress interface (Block 970) before the method 900 is left (Node 990) Otherwise, if these conditions are not met (NO branch of Decision 960), the forwarding information is sent to the control component 610 for advanced forwarding resolution (Block 980) before the method 900 is left (Node 990).

Referring back to block 970, the packet may be queued. Actually, as stated earlier with reference to FIG. 7, a pointer to the packet may be queued. The packet itself may remain in the shared memory. Thus, all queuing decisions and CoS rules may be applied in the absence of the actual packet. When the pointer for the packet reaches the front of the line, the I/O manager ASIC 722 may send a request for the packet to the second DBM ASIC 735*b*. The DBM ASIC 735 reads the blocks from shared memory and sends them to the I/O manager ASIC 722 on the FPC 720, which then serializes the bits and sends them to the media-specific ASIC of the egress interface. The I/O manager ASIC 715 on the egress PIC 710 may apply the physical-layer framing, perform the CRC, and send the bit stream out over the link.

Referring back to block 980 of FIG. 9, as well as FIG. 7, regarding the transfer of control and exception packets, the system control board 740 handles nearly all exception packets. For example, the system control board 740 may pass exception packets to the control component 610.

Although example embodiments consistent with the present description may be implemented on the example routers of FIG. 5 or 6, embodiments consistent with the present description may be implemented on communications network nodes (e.g., routers, switches, etc.) having different architectures. More generally, embodiments consistent with the present description may be implemented on an example system 900 as illustrated on FIG. 10.

Figure 10:
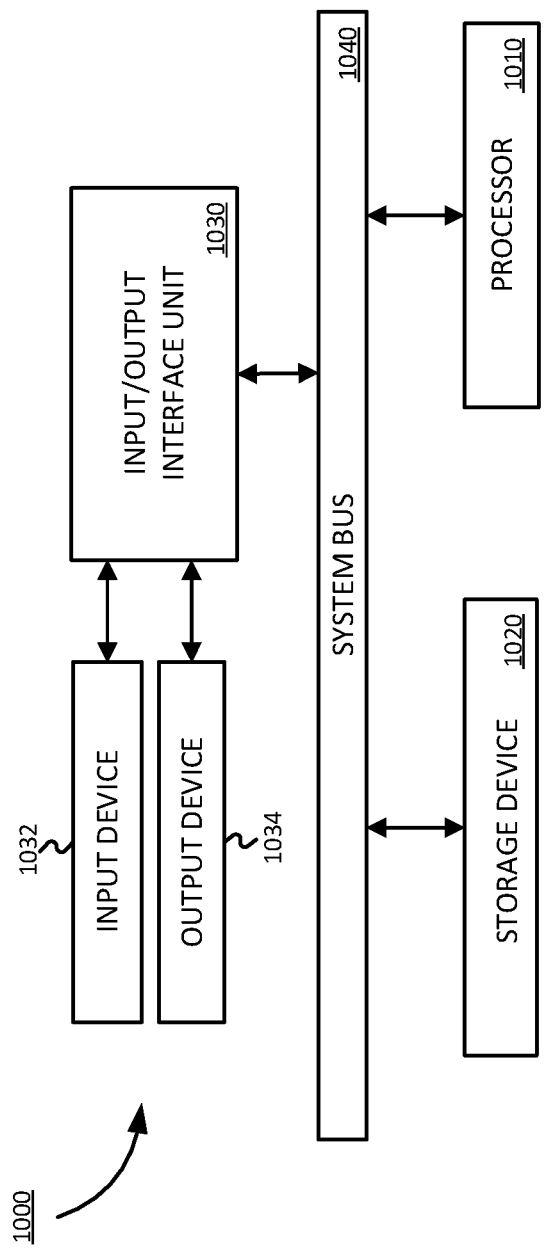
FIG. 10 is a block diagram of an example processor-based system that may be used to execute the example methods described, and/or to store information used and/or generated by such example methods.

FIG. 10 is a block diagram of an exemplary machine 1000 that may perform one or more of the processes described, and/or store information used and/or generated by such processes. The exemplary machine 1000 includes one or more processors 1010, one or more input/output interface units 1030, one or more storage devices 1020, and one or more system buses and/or networks 1040 for facilitating the communication of information among the coupled elements. One or more input devices 1032 and one or more output devices 1034 may be coupled with the one or more input/output interfaces 1030. The one or more processors 1010 may execute machine-executable instructions (e.g., C or C++ running on the Linux operating system widely available from a number of vendors) to effect one or more aspects of the present description. At least a portion of the machine executable instructions may be stored (temporarily or more permanently) on the one or more storage devices 1020 and/or may be received from an external source via one or more input interface units 1030. The machine executable instructions may be stored as various software modules, each module performing one or more operations. Functional software modules are examples of components of the present description.

In some embodiments consistent with the present description, the processors 1010 may be one or more microprocessors and/or ASICs. The bus 1040 may include a system bus. The storage devices 1020 may include system memory, such as read only memory (ROM) and/or random access memory (RAM). The storage devices 1020 may also include a hard disk drive for reading from and writing to a hard disk, a magnetic disk drive for reading from or writing to a (e.g., removable) magnetic disk, an optical disk drive for reading from or writing to a removable (magneto-) optical disk such as a compact disk or other (magneto-) optical media, or solid-state non-volatile storage.

Some example embodiments consistent with the present description may also be provided as a machine-readable medium for storing the machine-executable instructions. The machine-readable medium may be non-transitory and may include, but is not limited to, flash memory, optical disks, CD-ROMs, DVD ROMs, RAMs, EPROMs, EEPROMs, magnetic or optical cards or any other type of machine-readable media suitable for storing electronic instructions. For example, example embodiments consistent with the present description may be downloaded as a computer program which may be transferred from a remote computer (e.g., a server) to a requesting computer (e.g., a client) by way of a communication link (e.g., a modem or network connection) and stored on a non-transitory storage medium. The machine-readable medium may also be referred to as a processor-readable medium.

Example embodiments consistent with the present description (or components or modules thereof) might be implemented in hardware, such as one or more field programmable gate arrays ("FPGA"s), one or more integrated circuits such as ASICs, one or more network processors, etc. Alternatively, or in addition, embodiments consistent with the present description (or components or modules thereof) might be implemented as stored program instructions executed by a processor. Such hardware and/or software might be provided in an addressed data (e.g., packet, cell, etc.) forwarding device (e.g., a switch, a router, etc.), a laptop computer, desktop computer, a tablet computer, a mobile phone, or any device that has computing and networking capabilities.

§ 4.4 Refinements, Alternatives and Extensions

Although the example method(s) were described in the context of a layer 2 (L2) VPN, such as an EVPN, they may be applied at the egress of L3 VPNs instead.

In at least some example methods, an EVPN PE will advertise a new label named multihomed peer protection (MPP) label in addition to the KU label per RFC 7432.

In at least some such example methods, the MPP label is allocated on per EVI basis no matter how many multihomed ESes a PE is locally attached to.

In at least some such example methods, the MPP label will be advertised through a per ES Ethernet AD route with zero ESI value and with a Route Target (RT) or RTs belong to the EVI that the advertising EVPN PE belongs to. This MPP label is used for traffic sent to the backup (protector) egress PE during the fast reroute.

Referring back to block 325, decision 330=YES, and block 340 of FIG. 3, at the tail end of the bypass protection tunnel, to prevent the known unicast loop, in some implementations of the example method 300, the backup/protector egress PE is enhanced with an additional split horizon rule on top of its normal forwarding process for known unicast traffic. More specifically, the MPP label indicates that traffic is sent to it due to the fast reroute by its peer multihomed protected egress PE. Due to the presence of the MPP label, the receiving egress PE will impose a split horizon scheme to prevent the same flow from being sent back to its own bypass protection tunnel(s) in case the receiving PE also suffers a link failure on the same ES. Thus, if the multihomed ES attached locally is down, the traffic will be discarded. However, referring back to block 325, decision 330=NO, and block 335, if the traffic passes the split horizon check, it will be sent to its final destination per the normal forwarding process on the egress PE that protects the backup/protector egress PE. (Recall that PE1 and PE2 can act as protectors for each other.)

The solution proposed can be used to enhance the egress link protection scheme for EVPN VPWS mentioned in EVPN VPWS (RFC 8214) and avoid the looping issue for known unicast/BUM traffic for EVPN VPWS.

Although the example methods were discussed in the context of EVPNs, they can be applied to other L2 VPN services, and indeed, can be applied for L3 VPN services, to avoid looping at the egress. Referring back to FIG. 4, if used in the context of a L3 VPN, the destination address will not be a MAC address, but rather a destination prefix.

§ 4.5 CONCLUSIONS

As should be appreciated from the foregoing, the present description provides example method(s) for avoiding looping for known unicast traffic for EVPN, without using context label/ID for achieving fast reroute upon egress link failure.

The example method(s) addresses the root cause of looping in the event of double link unavailability at the egress of an EVPN to which a CE is multihomed (i.e., that the backup egress PE is unable to distinguish between fast reroute traffic coming from an egress PE it protects and the normal known unicast traffic coming from another EVPN PE(s)), while keeping the egress link protection scheme relatively simple. For example, they avoid altering or mandating a specific label allocation scheme that an EVPN PE may use. Further, if the traffic passes the MPP-based split horizon rule, the same forwarding scheme can be used for forwarding the known unicast traffic on the backup egress PE; regardless of whether the forwarding scheme uses MPLS-label-based disposition or MAC-based disposition. (Referring back to example method 300, the decision 330 can be made before the decision 315.) Moreover, the additional MPP label allocation and advertisement has a minimal impact to network scale since it is done on a per EVI basis, instead of on a per ES basis.

The example method(s) also works for different EVPN label allocation schemes, and different disposition schemes for known unicast traffic.

What is claimed is:

1. A computer-implemented method for avoiding looping of known unicast (KU) traffic between a first egress provider edge device (PE) and a second egress PE of an a transport network supporting all-active multihoming, wherein a customer edge device (CE) is multihomed to the at least first egress PE and the second egress PE, thereby defining a multihomed segment, wherein the second egress PE acts as a protector egress PE to the first egress PE, which acts as a protected egress PE, the computer-implemented method comprising:
    a) enabling the protector egress PE to distinguish between fast reroute (FRR) traffic coming from the protected egress PE and normal known unicast (KU) traffic coming from a PE of the transport network that is not attached to the same multihomed segment;
    b) receiving, by the protector egress PE, known unicast data, to be forwarded to the CE;
    c) determining, by the protector egress PE, that a link between it and the CE is unavailable; and
    d) responsive to determining that the link between the protector egress PE and the CE is unavailable,
        1) determining whether the known unicast traffic received was sent from the protected egress PE or from another PE of the transport network that is not attached to the same multihomed segment,
        2) responsive to a determination that the known unicast traffic received was sent from the protected egress PE,
            discarding the known unicast traffic received, and
        otherwise, responsive to a determination that the known unicast (KU) traffic received was sent from another PE of the transport network that is not attached to the same multihomed segment,
            sending the known unicast traffic, via a backup tunnel, to an egress PE which protects the protector egress PE.

2. The computer-implemented method of claim 1 wherein the act of enabling the protector egress PE to distinguish between fast reroute (FRR) traffic coming from the protected egress PE and normal known unicast (KU) traffic coming from another PE of the EVPN includes
    1) allocating, by the protector egress PE,
        a first (known unicast, or KU) service label for known unicast (KU) traffic, and
        a second (multihomed peer protection, or MPP) label indicating that the protected egress PE used fast reroute (FRR),
    2) advertising, by the protector egress PE, the allocated first service (KU) label and the second (MPP) label, to at least the protected egress PE.

3. The computer-implemented method of claim 2, further comprising:
    establishing, by the protected egress PE, forwarding state for the backup path for fast reroute, such that, upon link failure between the protected egress PE and the CE, the protected egress PE processes incoming KU traffic for forwarding to the protector egress PE by
        1) popping a known unicast service label,
        2) pushing the second (MPP) label, that was received from the protector egress PE, onto the KU traffic to generate first labeled KU traffic,
        3) pushing the first (KU) label, that was received from the protector egress PE, onto the updated KU traffic to generate second labeled KU traffic,
        4) pushing a transport label or transport label stack associated with a backup transport tunnel to the protector egress PE to generate encapsulated, second labeled KU traffic, and 5) sending, by the protected egress PE, the encapsulated, second labeled KU traffic to the protector egress PE via the backup transport tunnel.

4. The computer-implemented method of claim 3, further comprising:
receiving, by the protected egress PE, known unicast data, to be forwarded to the CE;
determining, by the protected egress PE, that a link between it and the CE is unavailable; and
responsive to determining that the link between the protected egress PE and the CE is unavailable,
1) popping a known unicast service label,
2) pushing the second (MPP) label onto the KU traffic to generate an instance of first labeled KU traffic,
3) pushing the first (KU) label advertised by the second egress PE onto the updated KU traffic to generate an instance of second labeled KU traffic,
4) pushing a transport label or transport label stack associated with a backup transport tunnel to the protector egress PE to generate an instance of encapsulated, second labeled KU traffic, and
5) sending, by the protected egress PE, the encapsulated, second labeled KU traffic to the protector egress PE via the backup transport tunnel.

5. The computer-implemented method of claim 2, wherein the multihomed segment is an Ethernet segment (ES) of an Ethernet Virtual Private Network (EVPN), and wherein the second (MPP) label is allocated on a per Ethernet VPN (EVI) basis, regardless of how many multihomed Ethernet Segments the protector egress PE is locally attached to.

6. The computer-implemented method of claim 2, wherein the multihomed segment is an Ethernet segment (ES) of an Ethernet Virtual Private Network (EVPN), wherein the second (MPP) label is advertised through a per Ethernet_Segment_Ethernet_Auto_Discovery route with a zero Ethernet Segment identifier (ESI) value and with at least one Route Target (RT) belonging to the EVI that the protector egress PE belongs to.

7. The computer-implemented method of claim 2 wherein the protector egress PE supports, for its known unicast traffic, at least one of (A) a label per EVI label allocation scheme, (B) a per BD label allocation scheme, or (C) a per (multihomed) ES label allocation scheme.

8. The computer-implemented method of claim 1, wherein responsive to a determination that both (1) a link between the protector egress PE and the CE is unavailable, and (2) the known unicast traffic received was sent from the protected egress PE, discarding the known unicast traffic received.

9. The computer-implemented method of claim 8 wherein the known unicast traffic received is discarded using on a split horizon rule.

10. The computer-implemented method of claim 1, wherein the act of determining, by the protector egress PE, whether the known unicast traffic received was sent from the protected egress PE or from another PE of the transport network that is not attached to the same multihomed segment, is based on a presence or absence of the second type (MPP) of label in the known unicast traffic.

11. The computer-implemented method of claim 1, wherein the first egress PE acts as a protector egress PE to the second egress PE, wherein by the first and second egress PEs protect one another.

12. The computer-implemented method of claim 1, wherein the transport network is one of (A) an Ethernet VPN (EVPN), (B) an Ethernet Local Area Network (E-LAN), (C) an Ethernet line (E-LINE), (D) an EVPN-Virtual Private Wire Service (EVPN-VPWS), (E) an Ethernet-TREE (E-TREE), or (F) an EVPN-ETREE.

13. A protector egress provider edge device (PE) belonging to the same multihomed segment as a protected egress PE, wherein a customer edge device (CE) is multihomed to the protector egress PE and the protected egress PE, the protector egress PE comprising:
a) at least one processor; and
b) a storage system storing processor-executable instructions which, when executed by the at least one processor, cause the at least one processor to perform a method comprising:
1) enabling the protector egress PE to distinguish between fast reroute (FRR) traffic coming from the protected egress PE and normal known unicast (KU) traffic coming from a PE of the transport network that is not attached to the same multihomed segment;
2) receiving, by the protector egress PE, known unicast data, to be forwarded to the CE;
3) determining, by the protector egress PE, that a link between it and the CE is unavailable; and
4) responsive to determining that the link between the protector egress PE and the CE is unavailable,
i) determining whether the known unicast traffic received was sent from the protected egress PE or from another PE of the transport network that is not attached to the same multihomed segment,
ii) responsive to a determination that the known unicast traffic received was sent from the protected egress PE,
discarding the known unicast traffic received, and
otherwise, responsive to a determination that the known unicast (KU) traffic received was sent from another PE of the transport network that is not attached to the same multihomed segment,
sending the known unicast traffic, via a backup tunnel, to an egress PE which protects the protector egress PE.

14. The protector egress PE of claim 13 wherein the act of enabling the protector egress PE to distinguish between fast reroute (FRR) traffic coming from the protected egress PE and normal known unicast (KU) traffic coming from another PE of the EVPN includes
1) allocating, by the protector egress PE,
a first (known unicast, or KU) service label for known unicast (KU) traffic, and
a second (multihomed peer protection, or MPP) label indicating that the protected egress PE used fast reroute (FRR),
2) advertising, by the protector egress PE, the allocated first service (KU) label and the second (MPP) label, to at least the protected egress PE.

15. The protector egress PE of claim 14, wherein the multihomed segment is an Ethernet segment (ES) of an Ethernet Virtual Private Network (EVPN), and wherein the second (MPP) label is allocated on a per Ethernet VPN (EVI) basis, regardless of how many multihomed Ethernet Segments the protector egress PE is locally attached to.

16. The protector egress PE of claim 14, wherein the multihomed segment is an Ethernet segment (ES) of an Ethernet Virtual Private Network (EVPN), wherein the second (MPP) label is advertised through a per Ethernet_Segment_Ethernet_Auto_Discovery route with a zero Ethernet Segment identifier (ESI) value and with at least one Route Target (RT) belonging to the EVI that the protector egress PE belongs to.

17. The protector egress PE of claim 13, wherein responsive to a determination that both (1) a link between the protector egress PE and the CE is unavailable, and (2) the known unicast traffic received was sent from the protected egress PE, discarding the known unicast traffic received.

18. The protector egress PE of claim 17 wherein the known unicast traffic received is discarded using on a split horizon rule.

19. The protector egress PE of claim 13, wherein the act of determining, by the protector egress PE, whether the known unicast traffic received was sent from the protected egress PE or from another PE of the transport network that is not attached to the same multihomed segment, is based on a presence or absence of the second type (MPP) of label in the known unicast traffic.

20. A non-transitory computer-readable storage medium provided on a protector egress provider edge device (PE) belonging to the same multihomed segment as a protected egress PE, wherein a customer edge device (CE) is multi-homed to the protector egress PE and the protected egress PE, and storing processor-executable instructions which, when executed by at least one processor, cause the at least one processor to perform a method comprising:
   a) enabling the protector egress PE to distinguish between fast reroute (FRR) traffic coming from the protected egress PE and normal known unicast (KU) traffic coming from a PE of the transport network that is not attached to the same multihomed segment;
   b) receiving, by the protector egress PE, known unicast data, to be forwarded to the CE;
   c) determining, by the protector egress PE, that a link between it and the CE is unavailable; and
   d) responsive to determining that the link between the protector egress PE and the CE is unavailable,
      1) determining whether the known unicast traffic received was sent from the protected egress PE or from another PE of the transport network that is not attached to the same multihomed segment,
      2) responsive to a determination that the known unicast traffic received was sent from the protected egress PE,
         discarding the known unicast traffic received, and
      otherwise, responsive to a determination that the known unicast (KU) traffic received was sent from another PE of the transport network that is not attached to the same multihomed segment,
         sending the known unicast traffic, via a backup tunnel, to an egress PE which protects the protector egress PE.

* * * * *